United States Patent
Saadeh et al.

(10) Patent No.: US 7,142,519 B2
(45) Date of Patent: *Nov. 28, 2006

(54) CORDLESS MODEM SYSTEM HAVING MULTIPLE BASE AND REMOTE STATIONS WHICH ARE INTERUSABLE AND SECURE

(75) Inventors: Said S. Saadeh, Plano, TX (US); Paul R. Fulton, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1186 days.

This patent is subject to a terminal disclaimer.

(21) Appl. No.: 09/896,428

(22) Filed: Jun. 29, 2001

(65) Prior Publication Data

US 2002/0006812 A1    Jan. 17, 2002

Related U.S. Application Data

(63) Continuation of application No. 08/964,884, filed on Nov. 5, 1997, now Pat. No. 6,259,726, which is a continuation of application No. 08/541,287, filed on Oct. 10, 1995, now abandoned, which is a continuation of application No. 08/242,122, filed on May 13, 1994, now abandoned.

(51) Int. Cl.
*H04B 7/00* (2006.01)
(52) U.S. Cl. .................... 370/310.2; 370/310; 370/325; 455/557; 455/465; 455/447; 455/448; 455/443; 710/64; 710/72
(58) Field of Classification Search ................ 370/310, 370/310.2, 328; 455/3.05, 403, 432.1, 421, 455/443, 556.1–561, 91, 92, 465, 447, 448; 710/64, 65, 72
See application file for complete search history.

(56) References Cited

U.S. PATENT DOCUMENTS

| | | | |
|---|---|---|---|
| 4,625,274 | A | 11/1986 | Schroeder |
| 4,644,105 | A | 2/1987 | Cameron |
| 4,644,347 | A | 2/1987 | Lucas et al. |
| 4,665,519 | A | 5/1987 | Kirchner et al. |
| 4,669,108 | A | 5/1987 | Deinzer |

(Continued)

FOREIGN PATENT DOCUMENTS

DE          4236778 A1       5/1994

(Continued)

OTHER PUBLICATIONS

M. Leonard, "Wireless Data Links Broaden LAN Options," Electronic Design Report, pp. 51, 52, 56-58 (Mar. 19, 1992).

(Continued)

*Primary Examiner*—Chi Pham
*Assistant Examiner*—Raj Jain

(57) ABSTRACT

A cordless modem system where a mobile station unit (MSU) is located in the computer and a base station unit (BSU) is connected to the telephone line. A radio frequency (RF) link is developed between the two units to allow a cordless connection. A series of commands are used between the two units to allow the MSU to request a channel, the BSU to grant a channel, the BSU to notify of a ring, and the MSU to request the BSU to go off hook. In addition, there is preferably a command sequence to allow authorization of a particular MSU or BSU. There are two full duplex channels in each MSU and BSU. This allows multiple BSUS and MSUS to be utilized in a small area. Communications between the two units are secure based on address values for each 15 unit contained in the various commands.

21 Claims, 19 Drawing Sheets

U.S. PATENT DOCUMENTS

| | | | |
|---|---|---|---|
| 4,697,281 A | | 9/1987 | O'Sullivan |
| 4,881,258 A | | 11/1989 | Kaiwa et al. |
| 4,972,457 A | | 11/1990 | O'Sullivan |
| 5,020,090 A | | 5/1991 | Morris |
| 5,249,218 A | | 9/1993 | Sainton |
| 5,282,238 A | | 1/1994 | Berland |
| 5,319,699 A | | 6/1994 | Kerihuel et al. |
| 5,325,418 A | | 6/1994 | McGregor et al. |
| 5,327,486 A | | 7/1994 | Wolff et al. |
| 5,379,290 A | | 1/1995 | Kleijne |
| 5,457,742 A | | 10/1995 | Vallillee et al. |
| 5,459,458 A | | 10/1995 | Richardson et al. |
| 5,479,475 A | | 12/1995 | Grob et al. |
| 5,479,485 A | | 12/1995 | Hayashi |
| 5,619,725 A | | 4/1997 | Gordon |
| 5,701,515 A | * | 12/1997 | Gradeler .................. 710/14 |
| 5,937,348 A | * | 8/1999 | Cina et al. ................ 455/421 |
| 6,128,510 A | * | 10/2000 | Beukema et al. ........... 455/557 |
| 6,507,610 B1 | | 1/2003 | Saadeh et al. |

FOREIGN PATENT DOCUMENTS

| | | |
|---|---|---|
| JP | 3268553 | 11/1991 |
| JP | 445455 | 2/1992 |
| JP | 451742 | 2/1992 |
| JP | 456454 | 2/1992 |
| JP | 4354229 | 12/1992 |
| WO | WO 93/20643 A1 | 10/1993 |

OTHER PUBLICATIONS

IBM Corporation Press Release, entitled "New IBM Cordless Computer Connection Offers Enhanced Mobility to Online Users," pp. 1-2, (Sep. 10, 1997).

IBM Corporation, "Cordless Computer Connection," pp. 1-3 (Sep. 1997).

IBM Corporation, "IBM Cordless Computer Connection," http://www.pc.ibm.com/us/options/cordconn, pp. 1-2 (at least as early as Apr. 9, 1998).

IBM Corporation, "Options by IBM Cordless Computer Connection," http://www.pc.ibm.com/us/options/products/6752_62e.html, pp. 1-4 (at least as early as Apr. 9, 1998).

IBM Corporation, "IBM wins seven innovations '98 Awards at Winter CES," http://www.ibm.com/News/1998/01/1s980108.html, pp. 1-2 (at least as early as Apr. 9, 1998).

IBM Corporation Press Release, "IBM Receives Seven Innovations '98 Awards at Winter CES," http://www.ideal.co.uk/ideal/news/pressrel/pr0902.html, pp. 1-4 (Sep. 1, 1998).

J. Gliedman, "The Cordless Connection Lets You Wander While You Surf," http://www1.zdnet.com/cshopper/content/9803/279211.html, pp. 1-2 (at least as early as Apr. 9, 1998).

Newton, "Newton's Telecom Dictionary," p. 504 (1994).

D.J. Goodman, "Trends in Cellular and Cordless Communications," IEEE Communications Magazine, pp. 19-29 (1991).

D.J. Goodman, "Cellular Packet Communications," IEEE Transactions on Communications, vol. 28, No. 8, pp. 1272-1280 and 453-461 (1990).

* cited by examiner

CORDLESS MODEM SYSTEM HAVING MULTIPLE BASE AND REMOTE STATIONS WHICH ARE INTERUSABLE AND SECURE

RELATED CASES

This application is related to Ser. No. 08/242,302, entitled "CORDLESS MODEM SYSTEM HAVING BASE AND REMOTE STATIONS WHICH IS COMMUNICATIONS SOFTWARE TRANSPARENT," filed May 13, 1994. This is a continuation of U.S. Ser. No. 08/964,884, filed Nov. 5, 1997, now U.S. Pat. No. 6,259,726, which is a continuation of U.S. Ser. No. 08/541,287, filed Oct. 10, 1995, now abandoned, which is a file wrapper continuation of U.S. Ser. No. 08/242,122, filed May 13, 1994, now abandoned.

BACKGROUND OF THE INVENTION

1. Field of the Invention

The invention relates to a system having a cordless connection between a modem in a computer and a telephone land line, and more particularly to allowing multiple units and yet maintaining security of each connection.

2. Description of the Related Art

Mobile computers, particularly laptop computers and notebook computers have become increasingly popular. They have performance and capabilities near that of a desktop unit, and if color active matrix liquid crystal displays are utilized, the display is as good as a desktop unit. When combined with the mobility, the popularity is quite understandable. However, one problem with using portable computers is that often they need to be connected to various equipment. For example, when located in a office, it is desirable to connect to various office wide items or non-portable items. For example, a network interface is often necessary, as is a SCSI port for use with various external devices such as CD-ROMs. This situation has conventionally been handled using expansion bases, which contain expansion cards for network and SCSI use and connections for a video monitor, a printer and a full size keyboard, or port replicator strips, which are used to simply provide the connections to the monitor, printer and keyboard without the need for expansion cards.

One of the computer applications which is becoming prevalent is electronic mail or E-mail. The modern business often has a local area network (LAN), with E-mail and appointment calendar applications. A remote user, such as the laptop user away from the office needs to check periodically to maintain in full contact. Thus, a very common addition to a portable computer is a modem to allow remote access to the LAN or other dial up services. Typically this modem is installed in the laptop computer, not directly in any expansion base. So while an expansion base or port replicator may alleviate certain wiring problems, as the various cables need not be disconnected or connected when removing or installing the portable computer, it does not resolve the wiring concerns in the case of a modem, where a separate telephone line is still required to be plugged and unplugged into the modem in the computer. This results in aggravation for the user. Further, this phone line is yet another of the tangled mass of cables utilized with the modern computer. While the monitor, keyboard and SCSI cables are generally located right next to the computer to interconnect the various components, the telephone line often has to be strung across an office and thus is either unsightly or very difficult to route. This is a further drawback to standard conventional modem communications where the modem is contained in the personal computer, be it a laptop or a desktop unit.

Thus the use of a modem in a laptop computer results in aggravations for the user and additionally requires unsightly and cumbersome cabling. Therefore it is clearly desirable to simplify both the laptop portability concerns and the unsightly wiring problem.

SUMMARY OF THE PRESENT INVENTION

The present invention relates to a cordless modem system where a mobile station unit (MSU) is located in the computer or connected to the computer and a base station unit (BSU) which is connected to the telephone line. A radio frequency (RF) link is developed between the two units to allow a cordless connection between the computer and the telephone line. The BSU is completely powered from the telephone line, while the MSU is powered from the computer system. A software protocol is utilized between the two units to open a channel when a call is received or the computer wishes to go off hook. Each MSU and BSU have a personalized identification. The BSU is allowed to perform communications only with authorized and identified MSUs, while the MSU can perform communications only with BSUs with which it has previously communicated. A series of commands are present between the two units to allow the MSU to request a channel, the BSU to grant a channel, the BSU to notify of a ring, and the MSU to request the BSU to go off hook. In addition, there is preferably a command sequence to allow authorization of a particular MSU for use with the BSU.

Preferably, there are two channels in each MSU and BSU, each channel being full duplex. This presence of two channels allows multiple BSUs and MSUs to be utilized in a small area if desired. Once a particular BSU is receiving input or has made a connection with a particular MSU, the BSU is then dedicated to that MSU for the duration of the call. By having two channels, two BSUs can be present in the same environment. Communications between the two units are secure in that the BSUs and MSUs include collision detection logic to determine if both channels are already active. If so, the MSUs and BSUs do not start communication. If a channel is available, an MSU requests that channel, with the request command including the address or identification number of the MSU. The BSU receives the authorization request, checks its list of authorized MSUs and if present and the channel is available, provides a grant command to the MSU. When the BSU receives a call and a ring from the telephone line, after checking for an open channel, the BSU transmits a designated MSU identification along with a ring indication command so that only the specified MSU will answer the call. Further, the grant and ring indication commands include the BSU identification number so that the MSU will communicate only with that particular BSU while the call is on-going. In this manner, one MSU will not intercept the calls for another MSU after the link has been established and a BSU will not provide calls to unauthorized MSUs. This allows data transfer to be secure even though multiple MSUs are present and can generally share a single BSU.

Further, the development of the protocol is such that the communications software utilized in the computer is not even aware of the presence of the cordless connection. Both the MSUs and BSUs contain microcomputers and proper signaling to sense what action is requested from the modem or telephone line and perform the cordless or radio transmission function seamlessly. Thus conventional communication software can be utilized without any particular special commands or structure. This allows the user to continue to use his preferred communication software package.

Two embodiments of the MSU are provided, one configured as an external data access arrangement (DAA) to be connected with laptop modems configured to utilize external DAAs, while in the second embodiment the MSU is incorporated with the modem hardware to provide a single, fully integrated unit. The BSU is a single, preferably relatively small, box which simply plugs into the telephone line.

Thus by having this transparent cordless link, the laptop user does not have to disconnect or connect a telephone line each time he moves his laptop and further the telephone line need not be routed across open areas or through difficult passages.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
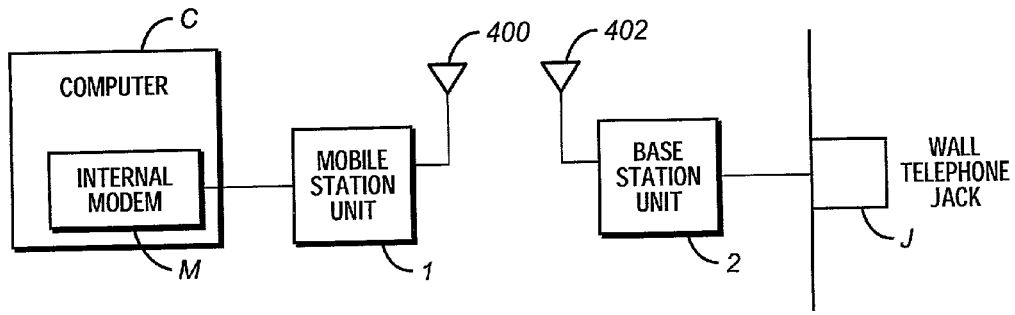
FIG. 1 is a block diagram showing the computer, cordless connection and telephone jack according to the present invention.

Referring now to FIG. 1, the basic arrangement of the components according to the present invention is shown. A computer system C, preferably a laptop or notebook computer but optionally a desktop computer, contains an internal modem M which is connected to a mobile station unit (MSU) 1. The MSU 1 includes an antenna 400. A telephone wall jack J is connected to telephone land line. A base station unit (BSU) 2 is connected to the telephone jack J and also includes an antenna 402. A radio frequency (RF) link is established between the MSU 1 and the BSU 2 to pass information between the computer C and the telephone jack J. The MSU 1 contains a serialized identification number, preferably 24 bits long, as does the BSU 2. This allows the MSU 1 to have a unique identity to allow security of communications. Similarly, the BSU 2 also has this identification to allow a secure link to be established. The MSU 1 is connected to the internal modem M by several alternate connections. In a first embodiment the MSU 1 is configured as an external data access arrangement (DAA) and is connected to an external DAA port of the internal modem M. In this embodiment the MSU 1 is contained in a small box or case. In an alternate embodiment the MSU 1 and the internal modem M are combined into a single unit, preferably in a PCMCIA form factor. The BSU 2 is connected only to the telephone jack J and is not otherwise powered but receives power from the telephone line. The BSU 2 is contained in a small box or case. The details of the MSU 1 and the BSU 2 are provided below.

Figure 3:
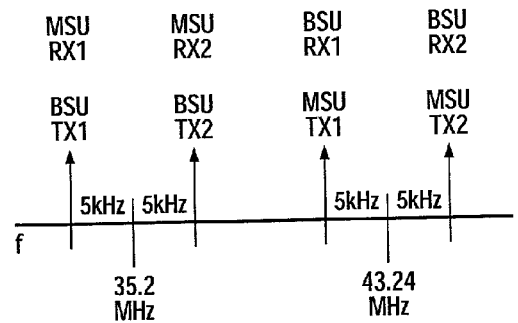
FIG. 3 illustrates the frequencies used by the RF link.

The RF link between the MSU 1 and the BSU 2 is a two channel, full duplex link as illustrated in FIG. 3. Center frequencies of 35.2 MHz and 43.24 MHz are preferably utilized with each channel. Each channel is developed as a five kHz sideband of the basic carrier, so that each channel has a 10 kHz bandwidth. The 35.2 MHz frequency is used as the transmit channel from the BSU 2 to the MSU 1, while the 43.24 MHz frequency is used as being receive channel from the MSU 1 to the BSU 2. The separation of frequencies allows both for duplex operation and also means that the MSU's 1 are not capable of receiving signals being transmitted by other MSU's, so that security is enhanced. The security process is described in more detail below.

Figure 2:
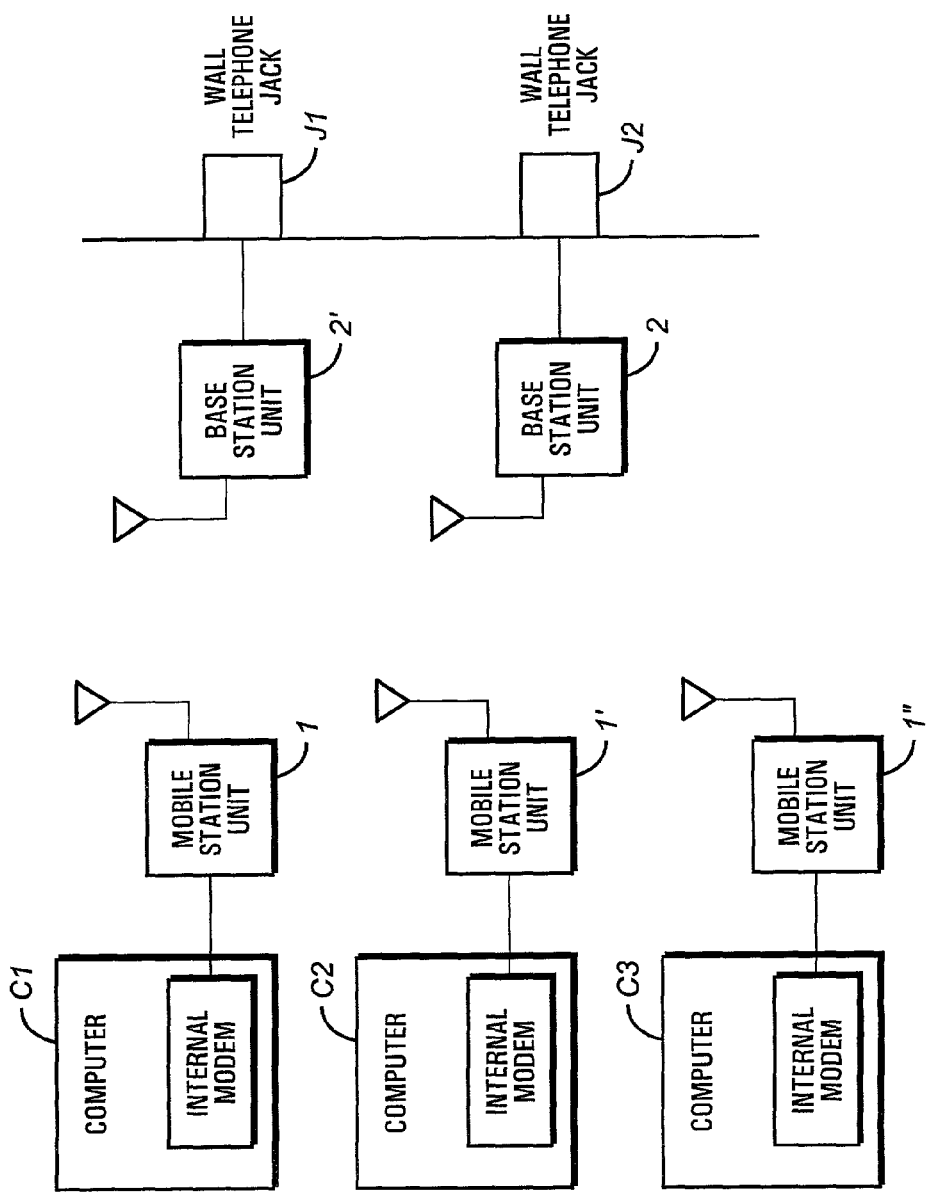
FIG. 2 is a block diagram illustrating multiple computer and MSUs and multiple BSUs of FIG. 1.

Referring now to FIG. 2, a more complex arrangement is shown. In this case three computers C1, C2 and C3 include respectively MSUs 1, 1' and 1". In addition, there are two telephone jacks J1 and J2 receiving respectively BSU 2 and BSU 2'. The two BSU 2 and BSU 2' are within the signal range of each other, so that if they were to utilize the same channel interference would occur. However, because two different channels are utilized, two BSUs can communicate within the same general area. Each MSU 1, MSU 1' and MSU 1" is free to communicate with either BSU 2 or BSU 2' depending upon channel availability and authorization access of the particular BSU 2 and BSU 2'.

Figure 4:
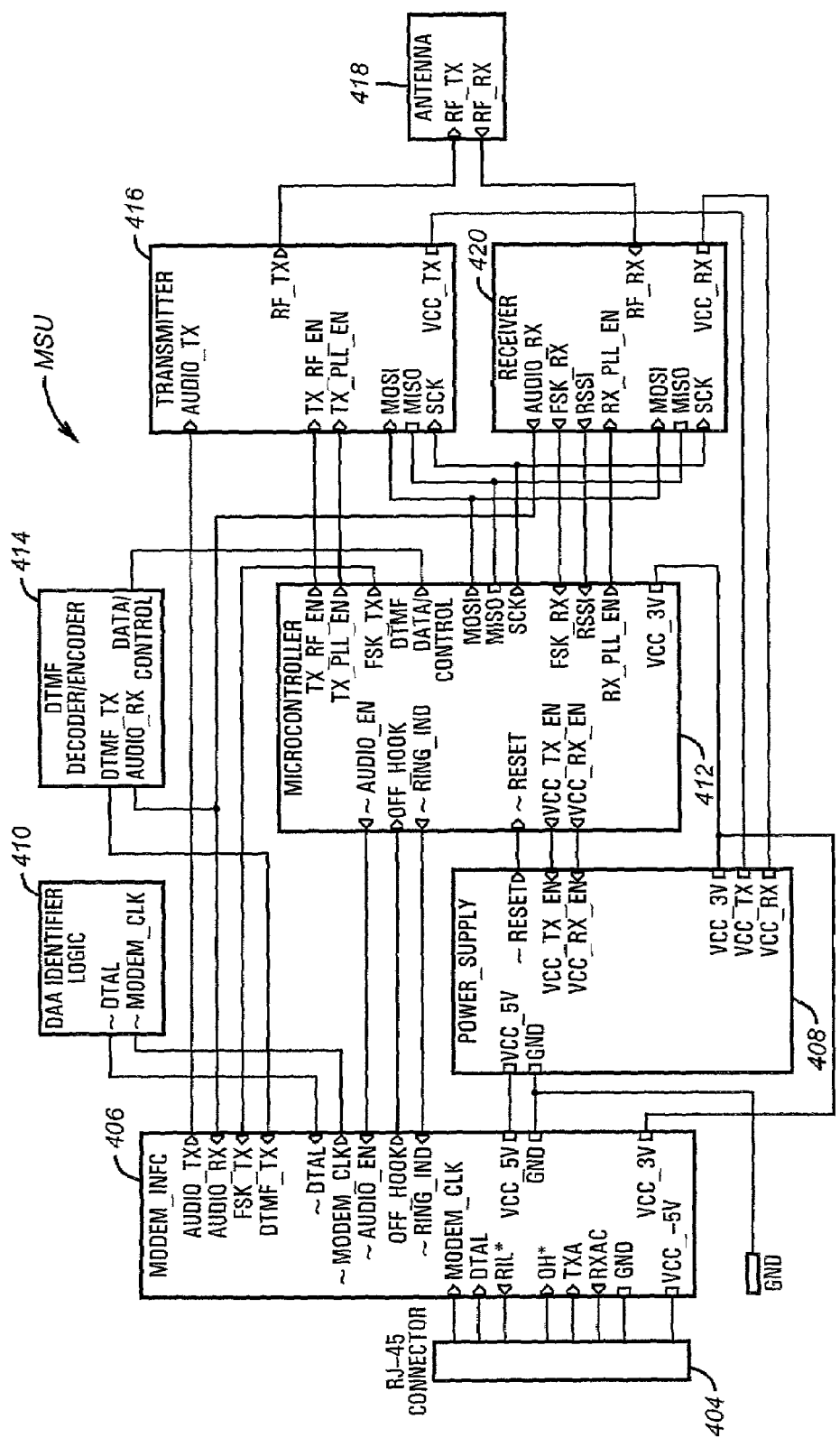
FIG. 4 is a block diagram of the mobile station unit of FIG. 1.

Referring now to FIG. 4, the block diagram of the MSU 1 is shown. An RJ 45 connector 404 is provided in the MSU 1 to allow connection of a cable between the MSU and the internal model M. A modem interface 406 is connected to the RJ 45 connector 404 and interfaces with the various signals. A power supply 408 is provided and connected to the modem interface 406 to receive power from the computer C and to provide the proper voltages for operation of the MSU 1. DAA identifier logic 410 is connected to the modem interface 406 to identify that the MSU 1 is connected to the internal modem M. A microcontroller 412, preferably the 68HC05 from Motorola, operates as the control point for the MSU 1. A DTMF decoder/encoder 414 is provided to allow signaling and dialing if necessary. An RF transmitter 416 is connected to properly frequency modulate the received audio signal and provide it to an antenna 418. The transmitter 416 is controlled by the microcontroller 412. A receiver 420 is connected to the microcontroller 412 and the antenna 418 to receive the RF signal from the base station BSU 2 and provide the audio signal to the modem interface 406. The receiver 420 is similarly controlled by the microcontroller 412.

Now the connections between the blocks will be described in more detail. The modem interface 406 receives the MODEM_CLK signal from the RJ 45 connector 404 and inverts and buffers this signal to develop a -MODEM_CLK signal provided to the DAA identifier logic 410. In this description a tilde prefix or an asterisk suffix is used to indicate a negative logic signal which is active when asserted low. The signal name without the tilde or asterisk means that it is the inverse of that signal with the tilde or asterisk. Similarly, the modem interface 406 receives the -DTAL or inverted data signal from the DAA identifier circuitry 410 and provides a buffered and inverted version to the RJ 45 connector 404. The DAA identifier logic 410 is configured to provide a code to the internal modem M to indicate the presence of the MSU 1 should the internal modem M need to make any changes. Conventionally the DAA identifier logic 410 provides the country code of the particular country for which the mobile station MSU 1 and base station BSU 2 are configured for operation. In an alternate embodiment the MODEM_CLK signal could be provided to the microcontroller 412, which would then provide the DTAL signal. This embodiment slightly complicates the programming but also reduces the cost and space by allowing removal of the separate DAA identifier logic 410.

An RIL* or inverted ring indication signal is provided from the modem interface 406 to the RJ 45 connector 404, which in this case is simply a buffered version of the to be -RING_IND or ring indication signal provided by the microcontroller 412. The OH* or inverted off hook signal from the RJ 45 connector 404 is inverted and provided to the microcontroller 412 to indicate that the internal modem M has requested the telephone line to go off hook. The TXA and RXAC or transmit analog and receive analog signals from the RJ 45 connector are provided to the modem interface 406. The TXA signal is combined with signals referred to as FSK_TX and DTMF_TX or frequency shift keyed and DTMF transmit signals by an operational amplifier circuit to develop the AUDIO_TX signal which is provided to the transmitter 416. Preferably the mobile station MSU 1 can provide either the analog or audio data being received from the internal modem M, which is utilized for conventional data communications, or can provide an FSK signal, which is utilized for command operations with the BSU 2. The FSK_TX signal is a buffered signal provided from a serial output of the microcontroller 412. Preferably DTMF tones can also be provided when necessary. An -AUDIO_EN or audio enable signal from the microcontroller 412 is associated with the AUDIO_TX signal in that it clamps the TXA signal being provided to a low level so that the FSK_TX signal used in the command phase is unimpaired. An AUDIO_RX signal received from the receiver 420, which is the audio or analog data received over the RF link, is provided in a buffered format to the RXAC output. The -AUDIO_EN signal also acts to clamp the AUDIO_RX signal to a low level. Additionally, the RJ 45 connector 404 provides ground and 5 volt connections to the modem interface 406. The modem interface 406 passes the 5 volt and ground connections to the power supply 408.

The power supply 408 provides a 3 volt output for operation of the circuitry of the preferred embodiment, to save power, and provides VCC_TX and VCC_RX signals which provide power to the transmitter 416 and the receiver 420 so that they can be completely powered down when not in operation. To the end, the VCC_TX_EN and VCC_RX_EN signals are received from the microcontroller 412 to control or enable the VCC_TX and VCC_RX outputs. The power supply 408 also provides the -RESET signal to the microcontroller 412 to reset the operation of the MSU 1 when the power supply is inadequate.

The DTMF decoder/encoder 414 provides the DTMF_TX output, which is used if dial tones are desired, and receives the AUDIO_RX signal from the receiver 420 to allow decoding of any received DTMF signals. The DTMF decoder/encoder 414 is connected to the microcontroller 412 through data and control signals so that the decoder/encoder 414 can interrupt the microcontroller when a detected DTMF code is received and can provide a bi-directional data and control port.

The transmitter 416 includes a radio frequency phased-locked loop (PLL) synthesizer (not shown) which includes a serial interface. The PLL receives command and setup data from a serial data link comprised of the signals MOSI, MISO and SCK from the microcontroller 412. The SCK signal is the clock signal while the other two signals are for the data input and data output. The serial interface allows the microcontroller 412 to properly program the PLL contained in the transmitter 416 to the desired frequency of channel 1 or channel 2. The output of the PLL is then provided to appropriate mixing circuitry to mix in the AUDIO_TX signal to produce the RF_TX signal, which is provided to the antenna 418. The antenna 418 can either be an integrated antenna or a short external antenna. Additionally, the microcontroller 412 provides the TX_RF_EN and TX_PLL_EN signals to the transmitter 416. The TX_PLL_EN signal is used to enable or disable the PLL when desired, while the TX_RF_EN signal disables the actual output of the transmitter 416 which is provided to the antenna 418. This allows the PLL to be activated or turned on in preparation for a transmission which is to occur.

Similarly, the receiver 420 includes a similar PLL, preferably the MC145170 from Motorola Semiconductor. The receiver 420 includes the MOSI, MISO and SCK signals. The transmitter 416 receives the VCC_RX signal from the power supply 408 to allow it to be completely powered down. An RX_PLL_EN signal is provided from the microcontroller 412 to receiver 420 to disable the PLL in the receiver 420. The receiver 420 also includes a mixer FM IF system, preferably the NE/SA606 from Phillips Semiconductor. The mixer FM IF system receives an RF_RX signal from the antenna 418 and properly mixes out the channel receive frequency so that only the received audio data is present. This is provided as the AUDIO_RX signal to the DTMF decoder/encoder 414 and the modem interface 406. An FSK_RX signal is a buffered version of the AUDIO_RX signal and is provided to a serial input of the microcontroller 412. Thus the FSK_TX and FSK_RX signals are serial output and input of the microcontroller 412. This serial interface of the microcontroller 412 is the command interface with the BSU 2. Preferably the serial interface operates at a low speed, such as 1200 or 2400 baud. The receiver 420 also provides an RSSI or receive signal strength indication to the microcontroller 412 to indicate that the carrier is being received from a BSU 2 and that a channel is active. This allows the MSU 1 to monitor for a received signal indicating that a given channel is busy.

Thus the MSU 1 provides the capability to receive analog audio data from the computer C and provide it over an FM modulated RF link to the base station BSU 2 and to similarly receive an RF signal from the base station BSU 2 and decode the signal to provide the RXAC analog signal to the computer C. The microcontroller 412 provides the control function which is needed for the modem interface and allows command passing between the base station BSU 2 and MSU 1.

Figure 5:
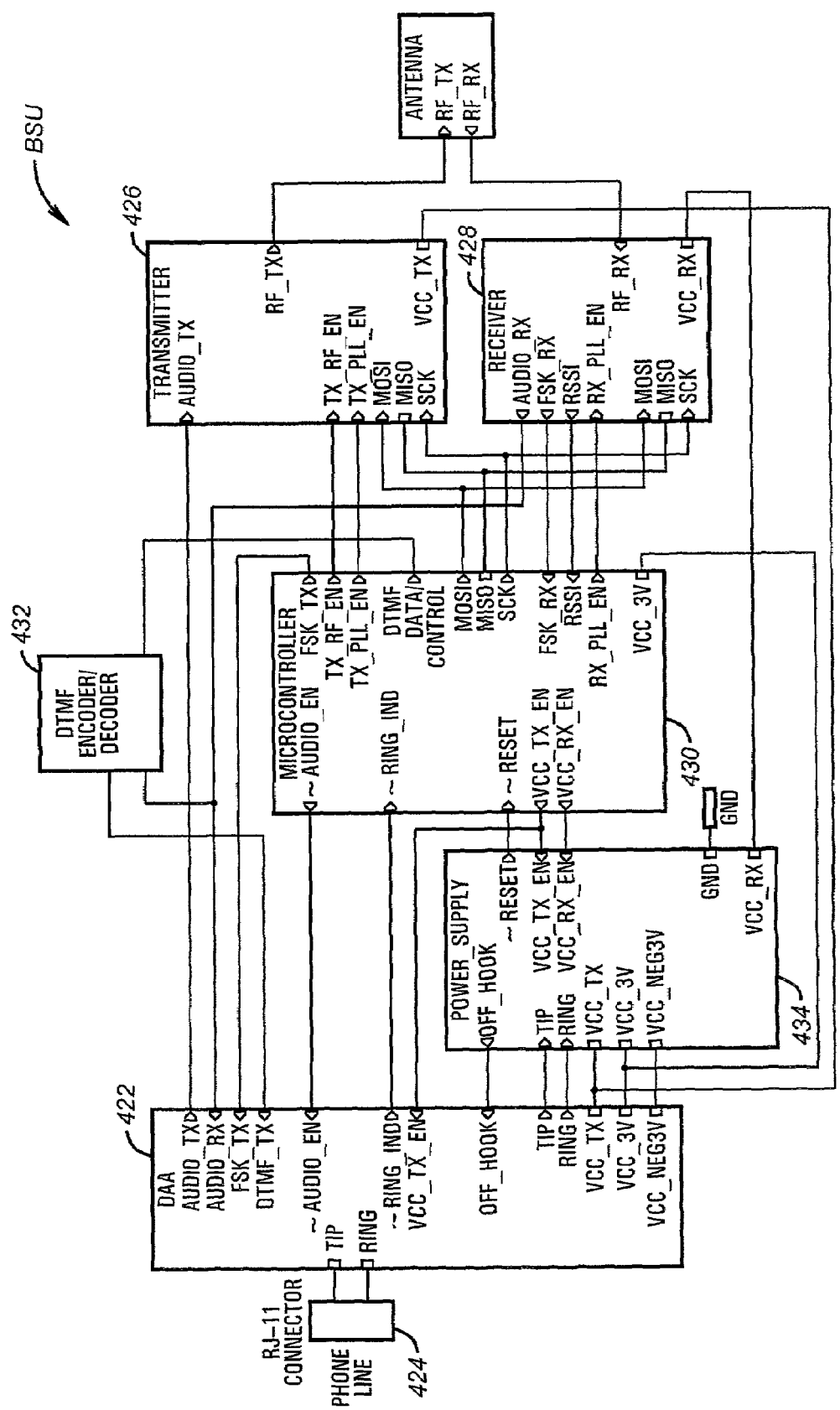
FIG. 5 is a block diagram of the base station unit of FIG. 1.

Referring now to FIG. 5, a block diagram of the BSU 2 is shown. As can be seen, the organization is very similar to that of the mobile station MSU 1 except that the modem interface 406 has been replaced by a DAA 422. An RJ11 connector 424 is provided to connect the DAA 422 to the phone line. The DAA 422 is connected to a transmitter 426, a receiver 428, a microcontroller 430, a DTMF decoder/encoder 432 and a power supply 434. The DTMF decoder/encoder 432, the transmitter 426 and the receiver 428 are configured in the fashion similar to that of the mobile station MSU 1 and will not be further described in detail. Again, the microcontroller 430 is similar, preferably an M68HC05. The DAA 422 contains the necessary interface between the telephone line TIP and RING signals which it receives as inputs and the various other signals in the base station BSU 2. The TIP and RING signals are provided to the power supply 434 to allow the base station BSU 2 to be entirely powered by the telephone line. For more details on this technique, please refer to copending application Ser. No. 08/242,314, filed concurrently herewith and titled "TELEPHONE LINE SOURCED POWER SUPPLY," which is hereby incorporated by reference. The power supply 434 provides the desired 3 volt signal and transmitter and receiver voltages as necessary. The DAA 422 includes a two wire to four wire conversion to develop the RX signal and utilize the TX signal as is conventionally known. Details of this conversion are not included but an example is illustrated in U.S. Pat. No. 5,127,046, which is hereby incorporated by reference. Similarly, in the DAA 422, the FSK_TX and DTMF_TX signals are utilized and combined with the audio signal received from two to four wire converter to provide the AUDIO_TX signal. The -AUDIO_EN signal is used to clamp or disable the audio signal from the two to four wire converter and AUDIO_RX signals so that the microcontroller 430 can properly communicate with the MSU 1. A RING_IND signal provided from the DAA 422 to the microcontroller 430 provides a ring detection indication which can be transmitted via a command to the MSU 1. The -OFF_HOOK signal is provided from the power supply 434 to the DAA 422 and is a combination of a VCC_TX_EN signal and a signal indicating that the power supply 434 needs recharged. Basically the power supply 434 includes a very large capacitor which is utilized to power the BSU 2 and the capacitor needs periodic recharging from the DC voltage present on the telephone line. When recharging is necessary, the power supply 434 causes the BSU 2 to momentarily go off hook to charge the capacitor. Thus, the -OFF_HOOK signal is developed either by the power supply 434 for charging or by the microcontroller 430 when communications are desired based on the VCC_TX_EN signal. In other respects the operation and configuration of the BSU 2 is the same as the mobile station MSU 1 and details are not provided.

Referring now to FIGS. 6, 7A, 7B and 8, these are block diagrams and schematics of a prior art modem which is located internal to a laptop computer and includes provisions for an external DAA. This modem is used in the preferred embodiment as the MSU 1 of FIG. 4 is designed to work with the external DAA connection. The modem 12 of FIG. 6 has a preference to use a device connected to the external DAA connection prior to using the internal DAA, so that if the MSU 1 is present, it will be utilized rather than the landline interface present on the modem 12. This description is provided for full enablement and to allow better understanding of the connections and operation of the mobile station unit MSU 1.

Figure 6:
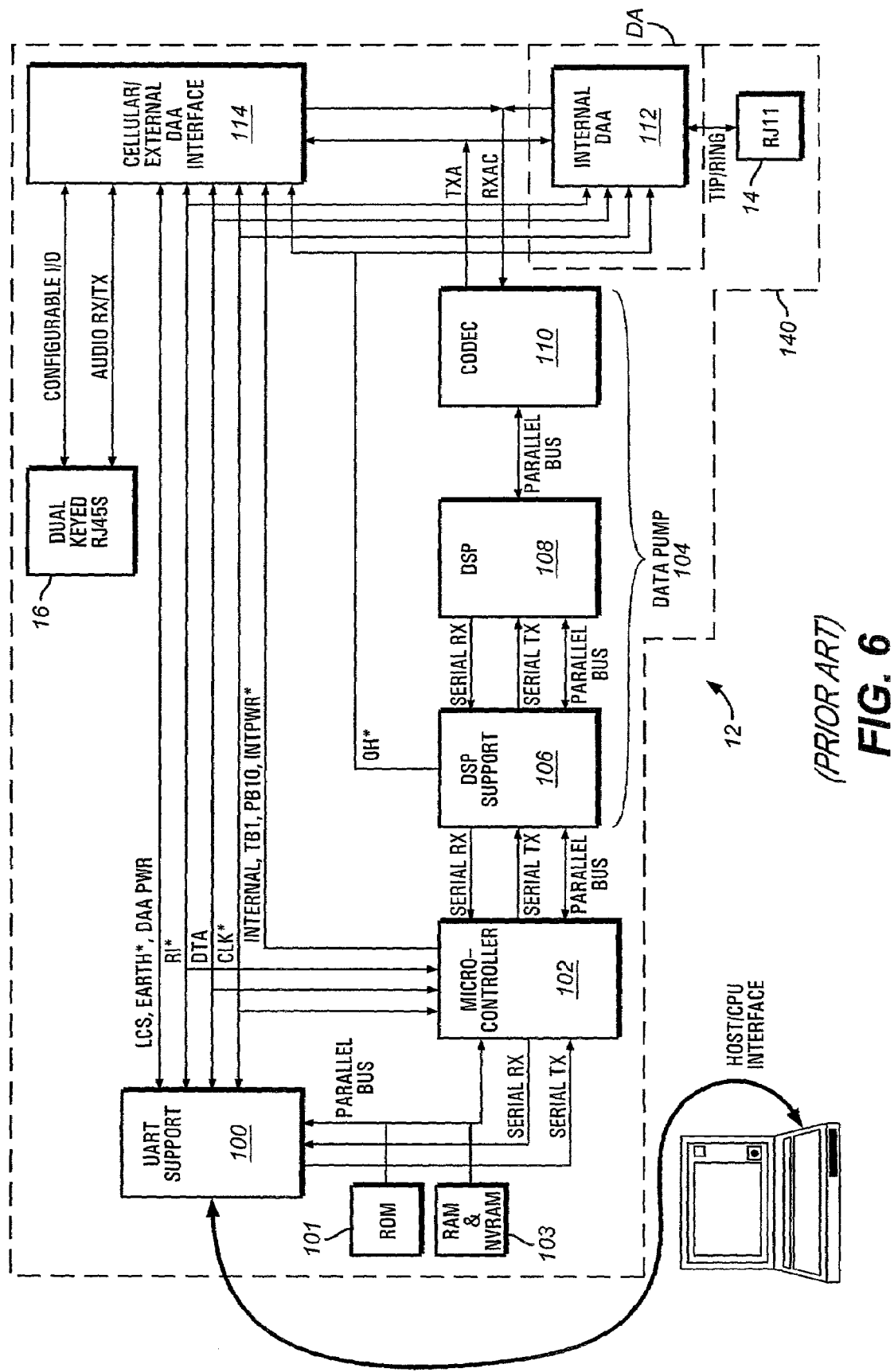
FIG. 6 is a block diagram of a prior art modem utilizing an external DAA.

FIG. 6 shows a logical block diagram of the various elements of the modem 12. The modem 12 preferably consists of two circuit boards combined to form the small unit which can be contained in a laptop computer. A motherboard MO contains all of the components, including an RJ11 type jack 14 and an RJ45 type jack 16, except those forming the internal DAA. The components of the internal DAA are located on a daughterboard DA which overlies the motherboard MO. This allows easy substitution of internal DAA's for various countries without requiring complete design of the entire modem 12, particularly the motherboard MO. The laptop computer physically contains the modem 12 and connects via an internal connector to a UART/support chip 100. The UART/support chip 100 typically connects to the host bus of the laptop computer, for example an EISA or ISA bus or PCMCIA interface, although it could be any type of typical communications bus. The UART/support chip 100 then appears as a universal asynchronous receiver transmitter (UART) to the laptop computer. The UART/support chip 100 connects to, among other things, a microcontroller 102 by both serial and parallel buses. The UART/support chip 100 provides a variety of functions to the modem 12, including communications to the laptop computer, clock controls, configurable registers, and power down control for the microcontroller 102. The UART/support chip 100 is typically an application specific integrated circuit, but could instead be constructed of discrete components.

The microcontroller 102 is typically an embedded controller, and in the preferred embodiment is a 68302 integrated multiprotocol processor, manufactured by Motorola Incorporated. A read only memory (ROM) 101 and random access memory (RAM) and non-volatile RAM (NVRAM) 103 are provided to allow for sufficient ROM and RAM space to contain the necessary firmware and data to operate the modem 12.

The microcontroller 102 communicates with a data pump 104 by both serial and parallel buses. The data pump 104 is typically a modem data pump chip set supporting the various protocols of modem communication, including V.32 bis protocol and fax protocols. In the preferred embodiment, the data pump 104 is a WE® DSP16A-V32FB-LT V.32bis plus FAX Data Pump Chip Set, sold by AT&T Microelectronics, and configured for 14.4 Kbps operation as a fax/modem. This chip set includes a digital signal processor (DSP) support chip 106, a DSP 108, and a coder-decoder (CODEC) 110. This chip set is interconnected according to AT&T specifications and provides the typical data pump features of control, analog-digital and digital-analog conversion, digital signal processing, and interfacing.

The microcontroller 102 communicates with the data pump 104 by both serial and parallel buses. The serial bus is used to transmit and receive data that will become the transmitted and received modem data, while the parallel bus is used to control and configure various features within the data pump 104. These features are controlled through the DSP support chip 106. The data pump 104 converts the digital serial data provided by the microcontroller 102 into the appropriate analog format. This is typically done by the DSP 108, which then transmits and receives the data via the CODEC 110.

The CODEC 112 connects to the actual external lines through analog transmit and receive signals, TXA and RXAC. These signals are selectively connected to either an internal DAA 112 or a cellular/external DAA interface 114. Details are provided below. The internal DAA is then connected to a telephone line by the RJ11 type jack 14, while the cellular/external DAA interface 114 can be connected through the RJ45 type jack 16 to an external DAA, a cellular phone or to the MSU 1.

Various signals are typically used to interface with telephone lines, including the ring indicator signal RI* and the off hook control signal OH*. A DAA generates and receives these signals, as well as the TXA and RXA signals, and converts them into a format suitable for that particular country's two-wire telephone system, or whatever type of telephone system to which the DAA is connected. The internal DAA 112 and the cellular/external DAA interface 114 receive OH* from the DSP support chip 106. Three lines are bi-directionally connected to the cellular/external DAA interface 114 and to the internal DAA 112. They are the lines carrying the RI* signal, a data signal DTA, and a clock signal CLK*. The functions of these signals in the modem 12 will become apparent.

The microcontroller 102 determines what is externally connected to the jacks and selects whether to use the cellular/external DAA interface 114 or the internal DAA 112. The microcontroller 102 further selects whether to use the cellular/external DAA interface 114 in a cellular phone mode or an external DAA mode. This is all done via the RI* signal, the DTA signal, and the CLK* signal, and the circuitry to accomplish this will be shown and described later.

The microcontroller 102 uses the parallel bus between it and the UART/support chip 100 to configure and determine the status of the UART/support chip 100. The UART/support chip 100 includes a number of registers addressable by the microcontroller 102. The registers provide for control of and access to a number of digital input/output (I/O) pins on the UART/support chip 100. One register provides the direction of each pin, either input or output. Another register provides the data value of bits which are set as outputs during a write operation and all data values when read. Additional bits can select the output pins as being tri-stated. Yet another register can select the various pins as causing an input to the microcontroller 102 upon a transition.

The laptop computer sends and receives data to the modem 12 via the UART/support chip 100, which then serially communicates that data to the microcontroller 102. The microcontroller 102 then establishes a communications link through either the internal DAA 112 or the cellular/external DAA interface 114, whichever is selected. To establish the communications link, the microcontroller 102 directs the proper sequence of signals to either originate or answer a telephone call. For example, in the land line model, the microcontroller 102 typically directs the DSP support chip 106 to drive the OH* signal low, then, after configuring the data pump 104 through their parallel bus, "listens" for a dial tone on the line, and then directs the data pump 104 to dial the number. Then, the microcontroller "listens" for an answer carrier through the data pump 104, and then directs the data pump 104 to establish whatever type of data communications link is desired. For the cellular phone 22, the sequence will be cellular specific, but the principles of establishing a data communications link are the same.

After establishing a data communications link, the microcontroller 102 serially sends to the data pump 104 the data to be transmitted to the communications device. The data pump 104 then processes this serial digital data and converts into an analog form suitable for communication at the rate and in the protocol desired. It then transmits this information via the TXA signal to the device the microcontroller 102 has selected, the cellular/external DAA interface 114 or the internal DAA 112, which then communicates via the active jack. Similarly, received data is transmitted from the active jack through the cellular/external DAA interface 114 or the internal DAA 112 to the data pump 104, which subsequently transmits that data to the microcontroller 102, which then transmits the data to the laptop computer by way of the UART/support chip 100. Of course, the microcontroller 102 may perform compression/decompression functions on the data going either direction, or otherwise "massage" the data.

Figure 7A:
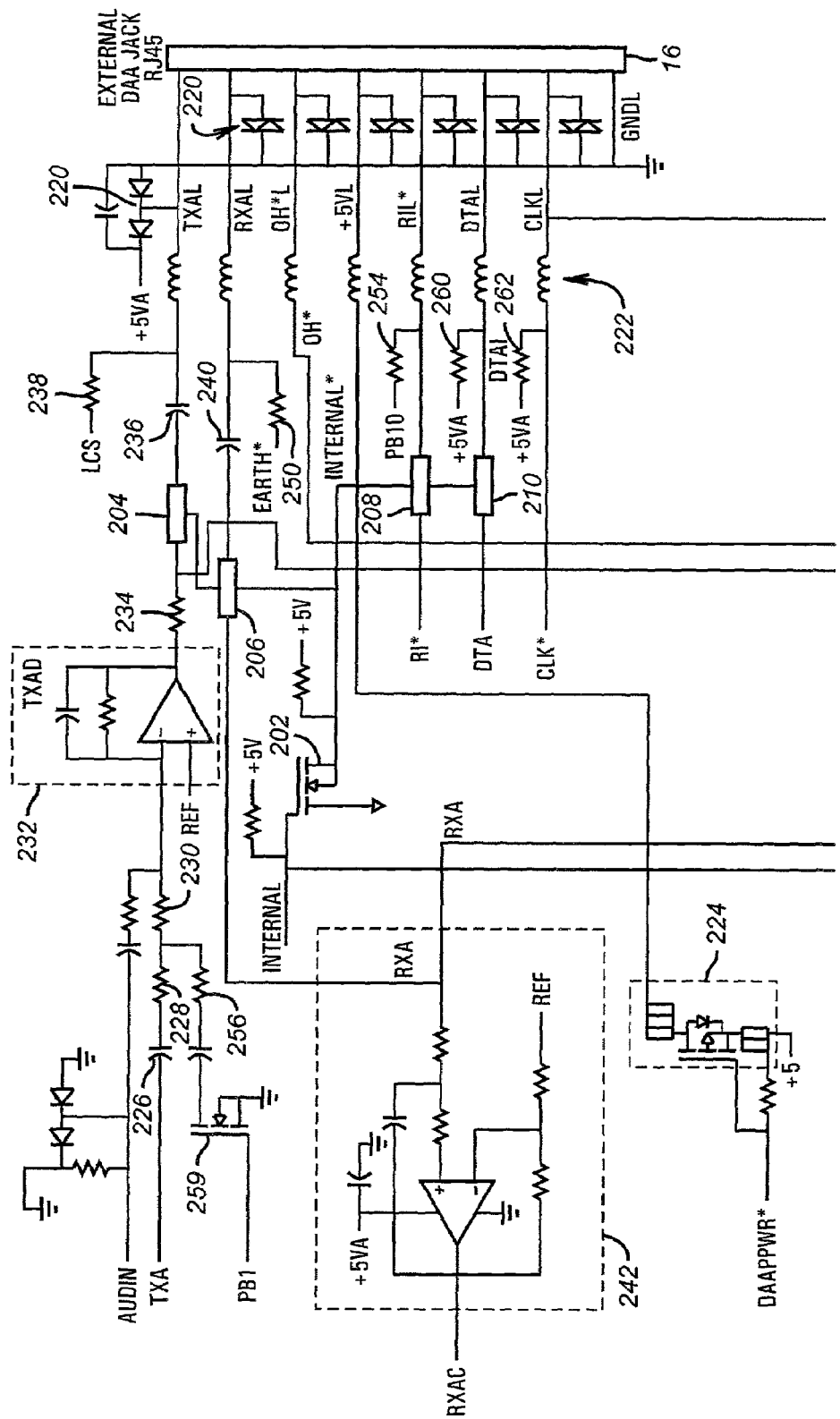
FIGS. 7A and 7B are schematic diagram of the external DAA interface of FIG. 6.
Figure 7B:
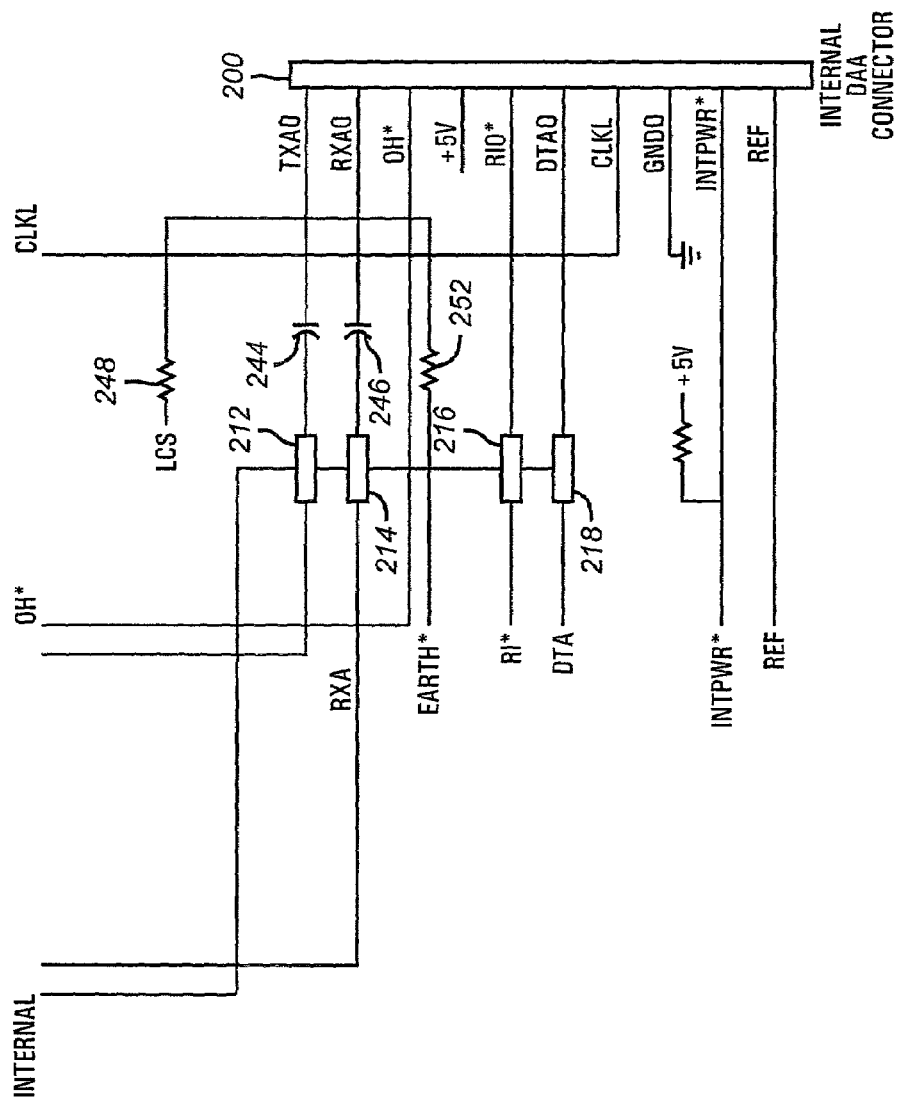

FIGS. 7A and 7B show the circuitry for selecting between utilizing the RJ45 type jack 16 and the RJ11 type jack 14. This selection circuitry selects between the RJ45 type jack 16 shown in FIGS. 7A and 7B, and an internal DAA connector 200, which then connects to the RJ11 type jack 14 via the internal DAA 112, as will be shown later in FIG. 8. This selection is accomplished by an internal selection signal INTERNAL, which is provided by the microcontroller 102. The inverse of this signal, INTERNAL*, is generated by a MOSFET 202 in an inverting configuration. In the preferred embodiment, the MOSFET 202 is a 2N7002. When INTERNAL is true, the internal DAA connector 200 is active. When INTERNAL is false, then INTERNAL* is true, and the RJ45 type jack 16 is selected for communications.

This selection process is accomplished by activation and deactivation of CMOS switches, preferably provided in CD4016 devices. Specifically, when INTERNAL is low, INTERNAL* is high, and the RJ45 type jack 16 is connected by CMOS switches to the various signal lines required for communications with the data pump 104, the UART/support chip 100, and the microcontroller 102 and the internal DAA connector 200 has connections removed from those signal lines by other CMOS switches. The TXA signal is connected to the RJ45 type jack 16 TXAL signal line via a switch 204. Similarly, the RXA signal is connected to the RJ45 type jack 16 RXAL signal line via a switch 206, the RI* signal is connected to the RJ45 type jack 16 RIL* signal line via a switch 208, and the DTA signal is connected to the RJ45 type jack 16 DTAL signal line via a switch 210. Note that a separate data signal DTAI is also provided for connection to the signal line DTAL. This is for separate control by the microcontroller 102, and is simply provided in the preferred embodiment to allow for independent control by the microcontroller 102 of the RJ45 type jack 16 DTAL line when the switch 210 is turned off.

When INTERNAL goes high, the internal DAA connector 200 becomes active. The TXA line is then connected to the internal DAA connector 200 TXA0 signal line via a switch 212, the RXA line is connected to the RXAO signal line via a switch 214, the RI* signal is connected to the RI0* signal line via a switch 216, and the DTA signal is connected to the DTAO signal line via a switch 218.

The CLK* signal remains connected to both the RJ45 type jack 16 and the internal DAA connector 200 at all times. The CLK* signal can be used bi-directionally by both the microcontroller 102 and the UART/support chip 100. It is typically, however, used as an input when using a Motorola or Nokia cellular phone, or when using the internal DAA 112 and it is on hook. CLK* is typically used as an output when using either DAA and they are off hook, or when using the external DAA 24 and it is on hook. The OH* signal is provided to the RJ45 type jack 16 as the OH*L signal line.

Also connected to the RJ45 type jack 16 are the ground signal GNDL and the 5 volt power supply +5VL. All of the signals on the RJ45 type jack 16 are protected and isolated by clamping diodes or transorbs 220 and inductors 222. The 5 volt power supply +5VL is selectively provided to the RJ45 type jack 16 when the signal DAAPWR* goes true, or low. When DAAPWR* goes low, it turns on RJ45 type jack power supply enable circuitry 224, which then drives +5V to the RJ45 type jack 16 +5VL line via the inductor 222.

Before connecting to the RJ45 type jack 16 or the internal DAA connector 200, the TXA signal is filtered and driven.

Specifically, the TXA signal is coupled through a capacitor 226, a resistor 228, and another resistor 230. A gain reduction block can be added if desired. It is then driven into a low pass filter 232, whose cutoff frequency is well above the highest frequency needed for modem communications. Here, that cutoff frequency is approximately 42 kHz. The signal is then transmitted through a resistor 234, the switch 204, and a coupling capacitor 236. After the coupling capacitor 236, the line can also be sensed or selectively pulled up or down via the signal LCS, connected via a resistor 238. The signal LCS, as well as signals EARTH* and DAAPWR are connected to the digital I/O pins of the UART/support chip 100 to allow the microcontroller 102 to control or monitor these signals. The PB1, PB10, and INTPWR* signals are supplied by the microcontroller 102. These signals are provided for compatibility with international and national standards, for implementation of protocols used by the modem 12, and for control of the cellular phone. Further, PB10 provides the microcontroller 102 with direct control of the RI* signal.

Similarly, the RXAL signal, before being transmitted to the data pump 104, is received from the RJ45 type jack 16, and driven through the inductor 222 and a coupling capacitor 240. It is then selectively driven through the switch 206, and is then provided to other circuitry in the modem 12 as the RXA signal. As the data pump 104 requires coupling of the RXA signal, the CODEC 110 of the data pump 104 is provided with an RXAC signal, which is generated by coupling the RXA signal in a coupler 242.

When the internal DAA connector 200 is selected by the switches 212 and 214, the TXA0 signal is first filtered through a capacitor 244 before being driven externally. This capacitor 244 is connected to the switch 212. The RXA0 signal is also first filtered through a capacitor 246 before being driven through the switch 214. The previously mentioned signal LCS, in addition to providing a sense and a selectable pull up/pull down to the TXAL signal, also senses or selectively pulls up or down the TXA0 signal between the internal connector 200 and the capacitor 244 via a resistor 248. The EARTH* signal also provides a sense or selectable pull up/pull down of the RXAL signal between the RJ45 type jack 16 and the capacitor 240 via a resistor 250 and provides a sense or selectable pull up/pull down of the RXA0 signal between the internal DAA connector 200 and the capacitor 246 via a resistor 252. The PB10 signal provides a sense or selectable pull up or down of the RIL* line via a resistor 254, and the PB1 signal is used to selectively attenuate the TXA signal via a resistor 256, a capacitor 258, and a switch 259, after that signal has been filtered through the capacitors 226 and 228. The DTAL and CLKL signals are pulled up to 5 volts through, respectively, resistors 260 and 262. On the internal DAA connector 200, two additional signals are provided. These are the internal power select signal INTPWR*, which is also pulled up by a resistor 264, and the REF signal, which is a 2.5 volt precision reference.

Figure 8:
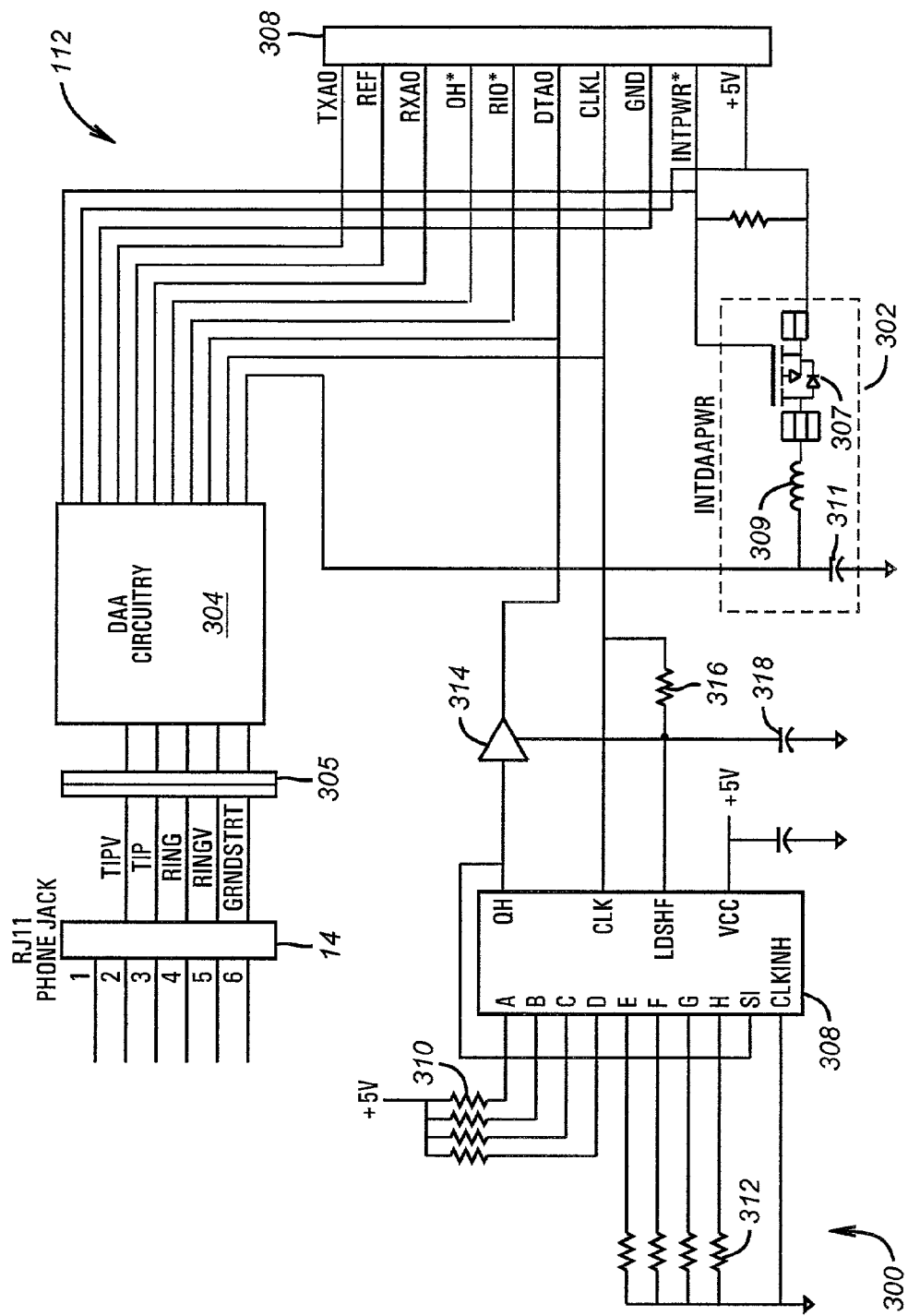
FIG. 8 is the schematic diagram of the internal DAA of FIG. 6.

FIG. 8 shows circuitry associated with the internal DAA 112 and provides an example of the DAA identifier circuitry 410 in the MSU 1. Three main blocks of circuitry are shown: the country or DAA identification circuitry 300, the power down circuitry 302, and the DAA circuitry 304. This circuitry is typically all placed on one board that is then connected to the main board of the modem 12 by connectors 305 and 306, which connect to the internal DAA connector 200. This allows for convenient swapping of internal DAA's when one desires to move to or remain in a different country.

As previously discussed, the RJ11 type jack 14 is typically located on the main board of the modem 12, and the connector 305 allows lines from the DAA circuitry 304 to connect to the RJ11 type jack 14. Typically, the connectors 305 and 306 are separate physical connectors.

The DAA circuitry 304 is typical DAA circuitry used to connect a modem to a land line, or physical telephone line, and uses the standard signals TIP, RING, TIPV, RINGV, and GRNDSTRT. The internal DAA 112 is connected to the internal DAA connector 200 via the connector 306. All of the signals from the connector 306 connect to the DAA circuitry 304. The signals INTPWR* and the +5V power line connect to the power down circuitry 302. When INTPWR* goes low, the power down circuitry 302 is enabled, and power is supplied to the DAA circuitry 304 through the signal INTDAAPWR. Specifically, a power switch 307 is connected to the +5V signal and to the signal INTPWR*. INTPWR* going low turns the power switch 307 on, providing power to an inductor 309 that then provides power to the DAA circuitry 304. Filtering the supplied power, and connected between the inductor 309 and ground, is a filtering capacitor 311. The power down circuitry 302 is standard switching circuitry, and is well known to those in electronic design.

The country identification circuitry 300 includes a shift register 308, which in the preferred embodiment is a 74HC165. The shift register 308 has certain of its parallel inputs pulled up by pullup resistors 310 and certain of its parallel inputs pulled down by pulldown resistors 312 to indicate a particular country. The output QH of the shift register 308 is driven to its serial input S1 as well as to an output buffer 314. The output buffer 314 is typically a 74HC126, and its output selectively drives the data line, DTA0. The LD*/SHF signal input of the shift register 308 is driven by an RC circuit consisting of a resistor 316 and a capacitor 318. The resistor 316 is connected to the CLKL signal and to the capacitor 318, which is then connected to ground. The LD*/SHF signal input of the shift register 308 is connected between the resistor 316 and the capacitor 318. This signal is also connected to the enable line of the output buffer 314.

When the LD*/SHF signal is high, the output buffer 314 is enabled, and the shift register 308 serially outputs the contents of its parallel inputs on its QH output as clocked by its CLK signal input, which is connected to CLKL.

The time constant of the RC filter made up of the resistor 316 and the capacitor 318 is approximately 0.5 milliseconds. When the clock is running at its slow rate, which has a period of much greater than 0.5 milliseconds, the LD*/SHF signal remains low, as does the enable line to the output buffer 314. This instructs the shift register 308 to load its parallel inputs A through H as specified by the pull up resistors 310 and the pull down resistors 312, and tristates the output buffer 314. When the CLKL signal is sped up, the LD*/SHF signal goes high, enabling the buffer 314 and causing the shift register 300 to shift data on the rising edges of the CLKL signal.

The pull up resistors 310 and the pull down resistors 312 are connected in an arbitrary way to indicate which country's telephone lines the DAA circuitry 304 is constructed to communicate with. In FIG. 8, the A, B, C, and D lines of the shift register 308 are pulled up, and the E, F, G, and H lines are pulled down. When clocked out, they serially clock out as "00001111." For another country, another arbitrary value is used. Further, all eight bits need not be used to designate country codes. For example, they can designate a type of DAA such as the MSU 1, or a particular configuration.

In this way, the microcontroller 102 can determine the configuration of the internal DAA 112 by "twiddling" the CLK signal and then reading the DTA0 signal returned, which is returned to the microcontroller 102 as the DTA signal. This circuitry is repeated on any attached external DAA 24 in a similar manner. In addition, all eight bits need not be used for country encoding but can also be used for other decoding purposes.

The microcontroller 102, through its signal lines INTERNAL and signal lines INTPWR* and DAAPWR* can both select and power up and down both the internal DAA 112 and any external DAA 24. The INTERNAL line allows for selection between the RJ45 type jack 16 and the internal connector 200, while the INTPWR* and DAAPWR* signals respectively provide for powering up or down the internal DAA 112 or any external DAA 24. The powering up and down of the internal versus the external DAA's is important on a laptop or notebook computer, as keeping these DAA's powered up requires a good deal of energy. Thus, by powering down these DAA's when they are not required, the laptop computer that uses the modem 12 can experience significantly increased battery life because of these power saving features of the modem 12.

Figure 9A:
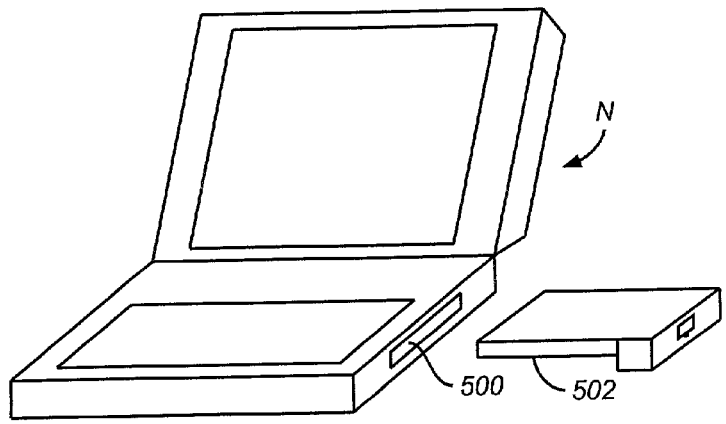
FIG. 9A is a diagram illustrating the installation of the integrated modem and MSU in a computer.
Figure 9:
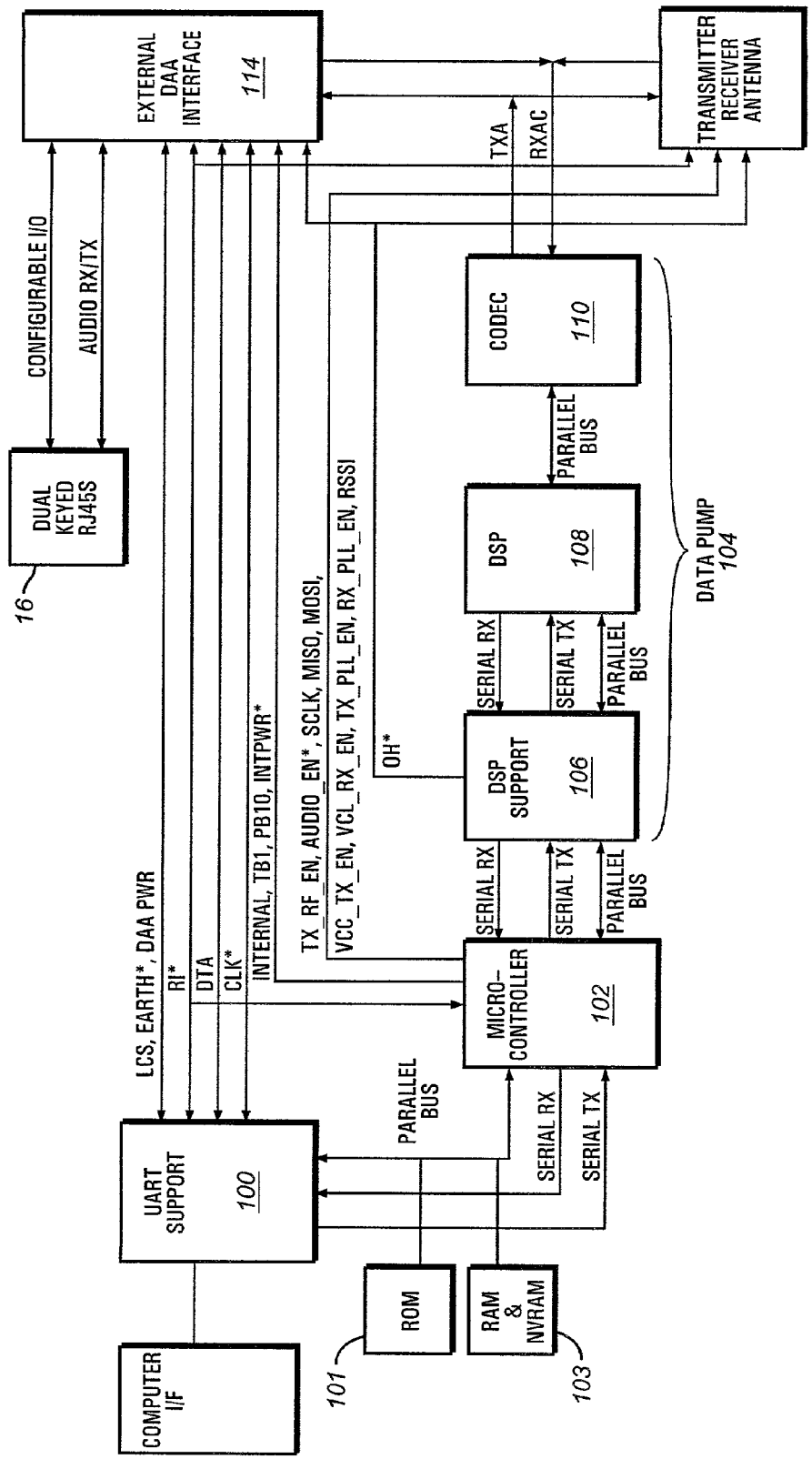
FIG. 9 is a block diagram of a combined modem and MSU unit according to the present invention.

FIG. 9 shows the block diagram of an alternate arrangement where the MSU 1 is integrated with the internal modem M preferably on a single PCMCIA type II form factor card. In this embodiment the modem M' does not include an RJ11 connector 14 but rather only includes a dual keyed RJ45 connector 16 which is connected to the external DAA interface 114. It is noted that the cellular connection is preferably disabled though it could optionally be utilized. Preferably also no internal DAA 112 is present for space reasons, instead utilizing an external DAA to a land line for direct wired communications. The internal DAA 112 has been replaced by the transmitter 416, receiver 420 and antenna 418 of the MSU 1. A separate microcontroller 412 is not necessary as the microcontroller 102 of the modem 12 is capable of performing the same functions and can be readily programmed. This allows savings of cost and space. Further, the DTMF and FSK generation circuitry and signals are not necessary as this can be provided by the data pump 104 to further save space and cost. Thus, the microcontroller 102 is connected to the transmitter/receiver/antenna unit only with the various enable signals, the serial interface necessary for the PLLs and the RSSI signal.

This physical embodiment is shown in FIG. 9A. The extension on a PCMCIA card 502 is utilized to incorporate the RF electromagnetics and the antenna 418. The notebook computer M of FIG. 9 includes a PCMCIA slot 500 and the modem/MSU 1 M' is contained in the PCMCIA card 502 which is properly inserted into the PCMCIA slot 500. Thus in this embodiment the MSU 1 is not contained in a separate box but is simply fully integrated along with the modem on a single card. An external DAA is necessary for direct landline operations, but this is acceptable as the primary connection to the laptop will be through the cordless link.

As noted above, both the MSU 1 and the BSU 2 contain microcontrollers and as a result software is utilized to control their operation. FIGS. 10A–10E and FIGS. 11A–11E illustrate the operation of the micro computers 412 and 430.

Figure 10A:
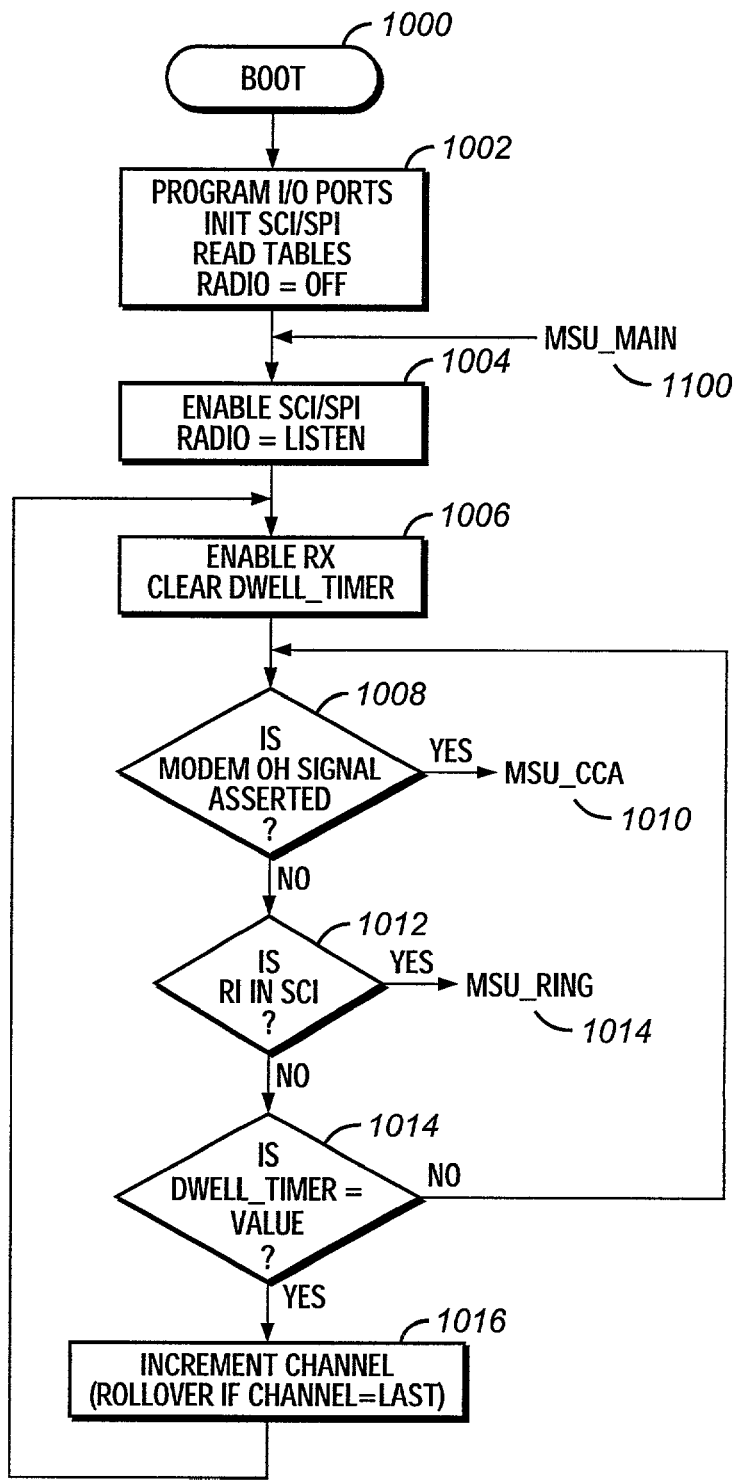
FIGS. 10A, 10B, 10C, 10D and 10E are flowchart illustrations of the operation of the mobile station unit of FIG. 1.
Figure 10B:
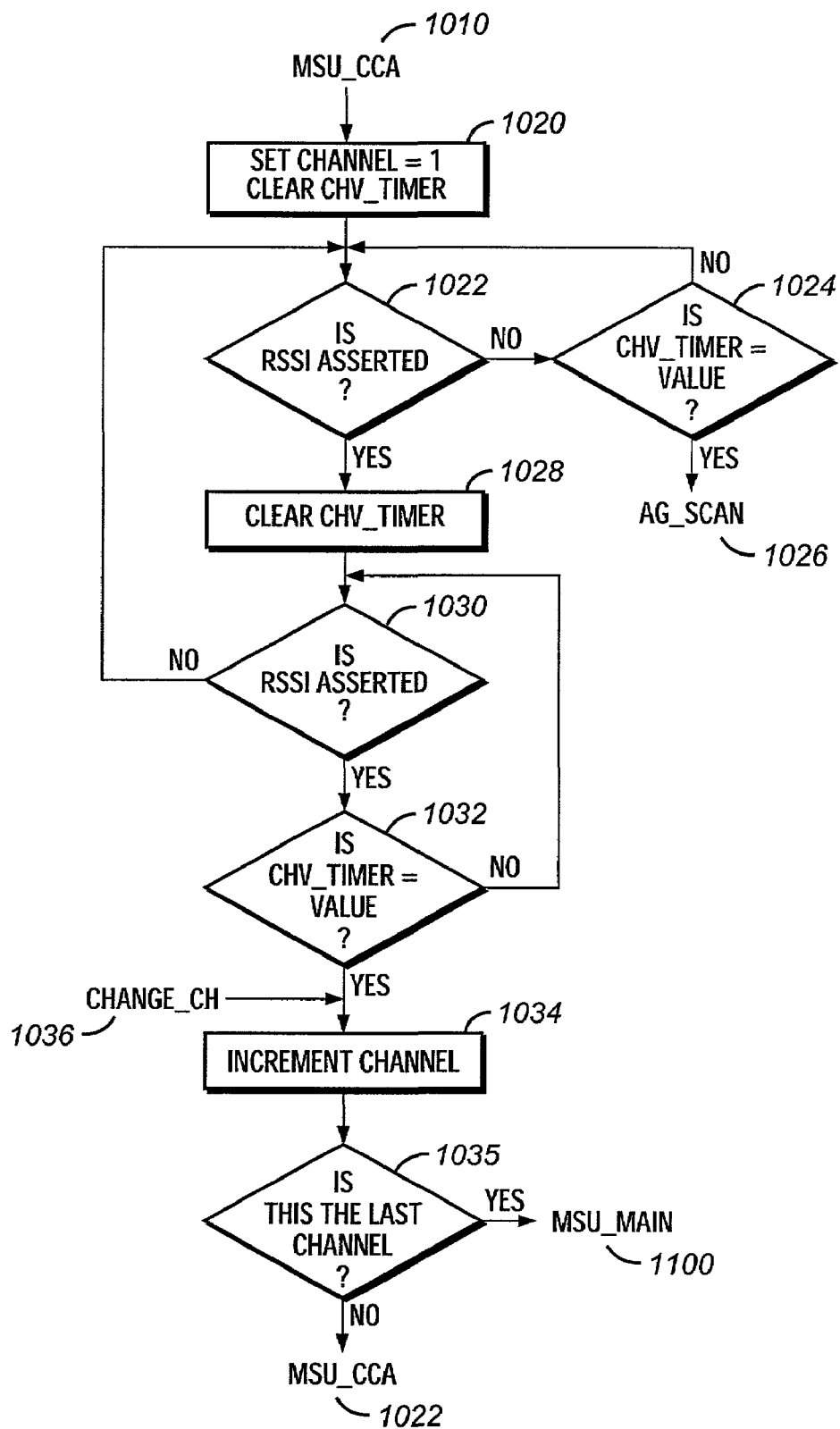

Referring now to FIG. 10A, the MSU 1 commences the BOOT sequence 1000 at step 1002 where the various inputs of the microcontroller 412 are properly programmed and the serial control interface with the FSK_RX and FSK_TX signals is initialized. Various tables are read to initialize the microcontroller 412 and the transmitter 416 and receiver 420 are turned to an off position, as indicated by the RADIO=OFF variable. This is done by disabling or negating the TX_RF_EN, TX_PLL_EN, RX_PLL_EN, VCC_TX_EN and VCC_RX_EN signals, so that they are fully disabled and unpowered. Control then proceeds to step 1004, which is the first step in the MSU_MAIN sequence 1100, where the serial control interface for the FSK data is enabled to allow reception of command data from the BSU 2.

Additionally, the receiver 420 is powered and activated or enabled to allow reception of command data from the base station BSU 2. Control then proceeds to step 1006, where the PLL in the receiver 420 is properly set and a dwell timer is set to a preferred value of 330 msec to allow checking of both channels. Control then proceeds to step 1008 to determine if the OFF_HOOK signal has been received from the RJ45 connector 404. If so, control proceeds to an MSU_CCA sequence 1010. If the OFF_HOOK signal has not been received, control proceeds to step 1012 to determine if a ring indication command has been received from the serial control interface. This would indicate that the BSU 2 has provided a ring indication command to the MSU 1 to indicate the presence of an incoming call that needs to be answered. The format of the various commands is shown in Table 1 at the end of this description. If an RI is present, control proceeds to the MSU_RING sequence 1014.

If an RI was not received, control proceeds to step 1014 to determine if the dwell time has elapsed. If not, control returns to step 1008 to continue scanning this channel for an off hook or ring indication. If the dwell time has elapsed, it is time to proceed to the next channel control proceeds to step 1016 where the channel is changed. The preferred embodiment utilizes two channels for simplicity, but a greater number of channels could be utilized. After incrementing the channel, control proceeds to step 1006 to continue to wait for either an off hook or ring indication command.

The MSU_CCA sequence 1010 (FIG. 10B) commences at step 1020 where a first channel is selected and a channel vacant timer is set. Preferably this time is 150 msec. This time is used to determine if another MSU 1 is operating on the same channel. Control then proceeds to step 1022 to determine if the RSSI signal is being received from the receiver 420. If not, control proceeds to step 1024 to determine if the channel vacant time has terminated. If not, control returns to step 1020 to determine if the channel is active and being utilized. If the channel vacant time has completed, control proceeds to the AG_SCAN sequence 1026. Thus the loop first checks for a currently occupied channel to avoid disrupting operations of the session in progress and to provide security. If the RSSI signal is asserted in step 1022, control proceeds to step 1028 where the channel vacant timer is cleared and then to step 1030 to again determine if the RSSI signal is still asserted. If not, control returns to step 1022 as the channel was just vacated. If it is still asserted, control proceeds to step 1032 to determine if the channel vacant timer has completed. If not, control returns to step 1030. Thus, if at any time during the channel vacant search time the channel clears, the channel vacant time is restarted so that a channel must be clear for at least 130 msec before a MSU 1 attempts to contact the base station BSU 2. If the time value has been completed, control proceeds from step 1032 to step 1034, which is also the entry point of the CHANGE_CH sequence 1036. In step 1034 the channel number is incremented and rolled over to the next channel if necessary. Control then proceeds to step 1035 to determine if the last channel has been scanned. If so, control returns to the MSU_MAIN sequence 1100 as the MSU 1 is not able to go off hook as all channels are busy. If not, control returns to step 1022 to continue scanning for a vacant channel.

Figure 10C:
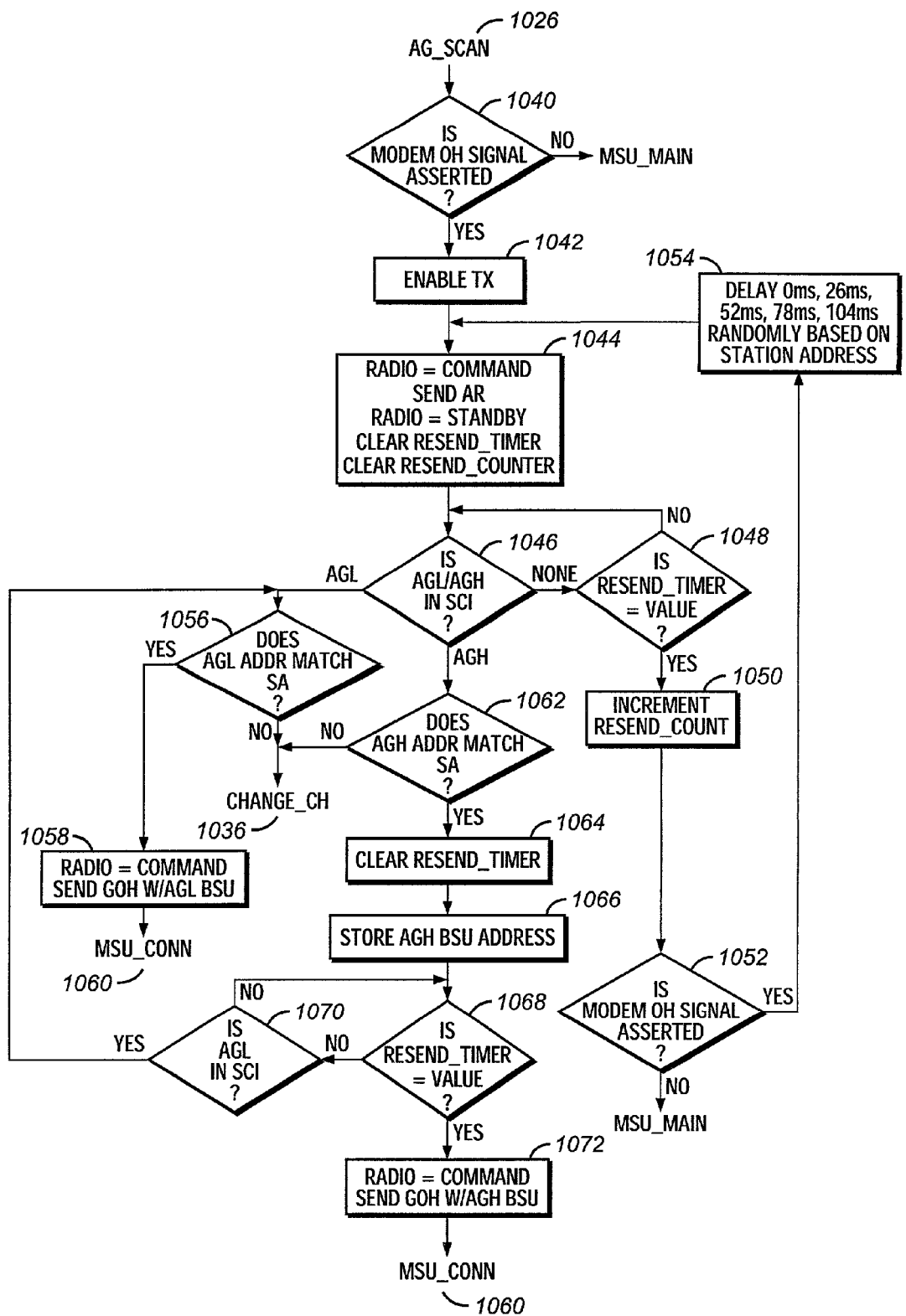
Figure 10D:
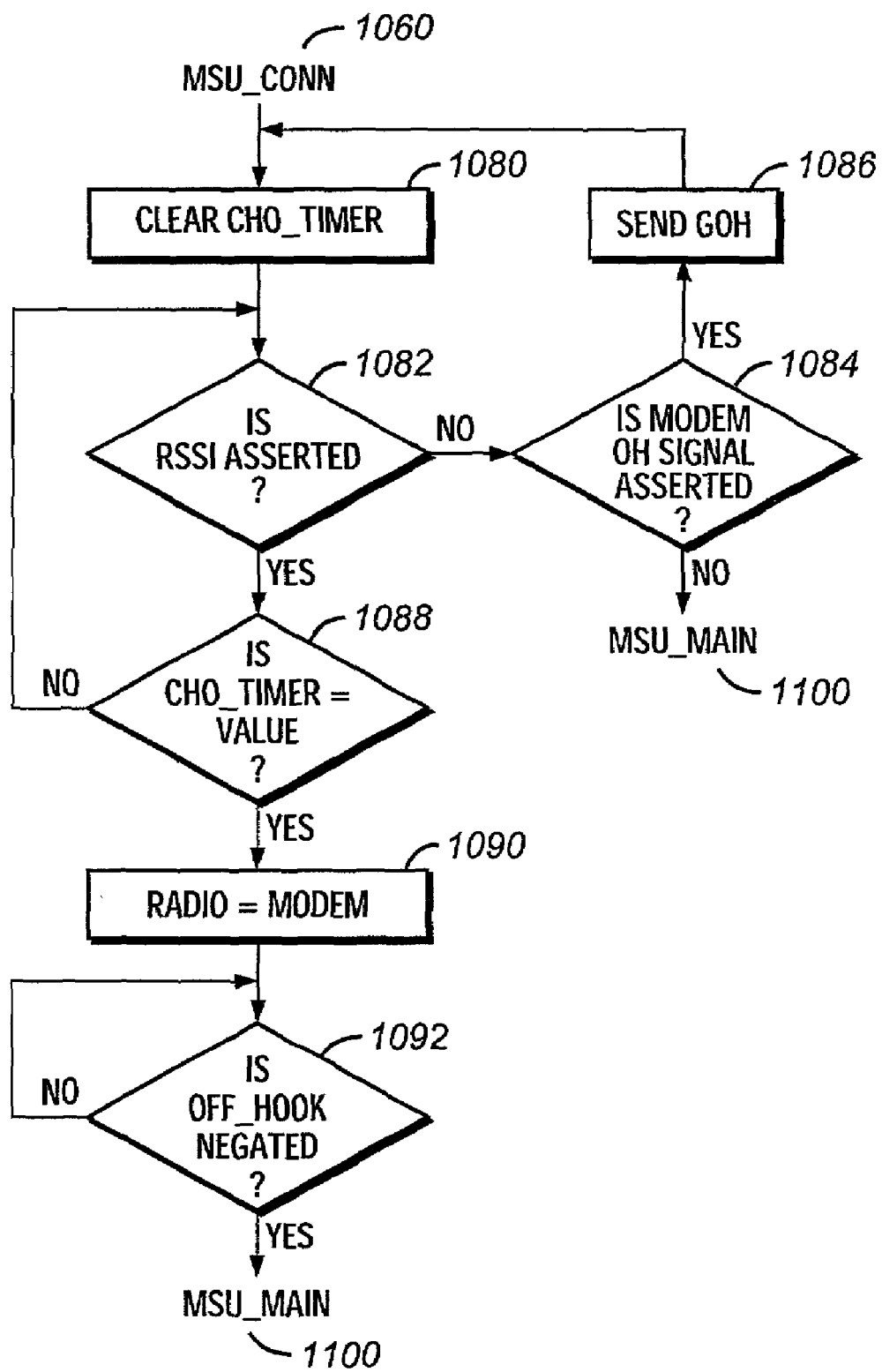
Figure 10E:
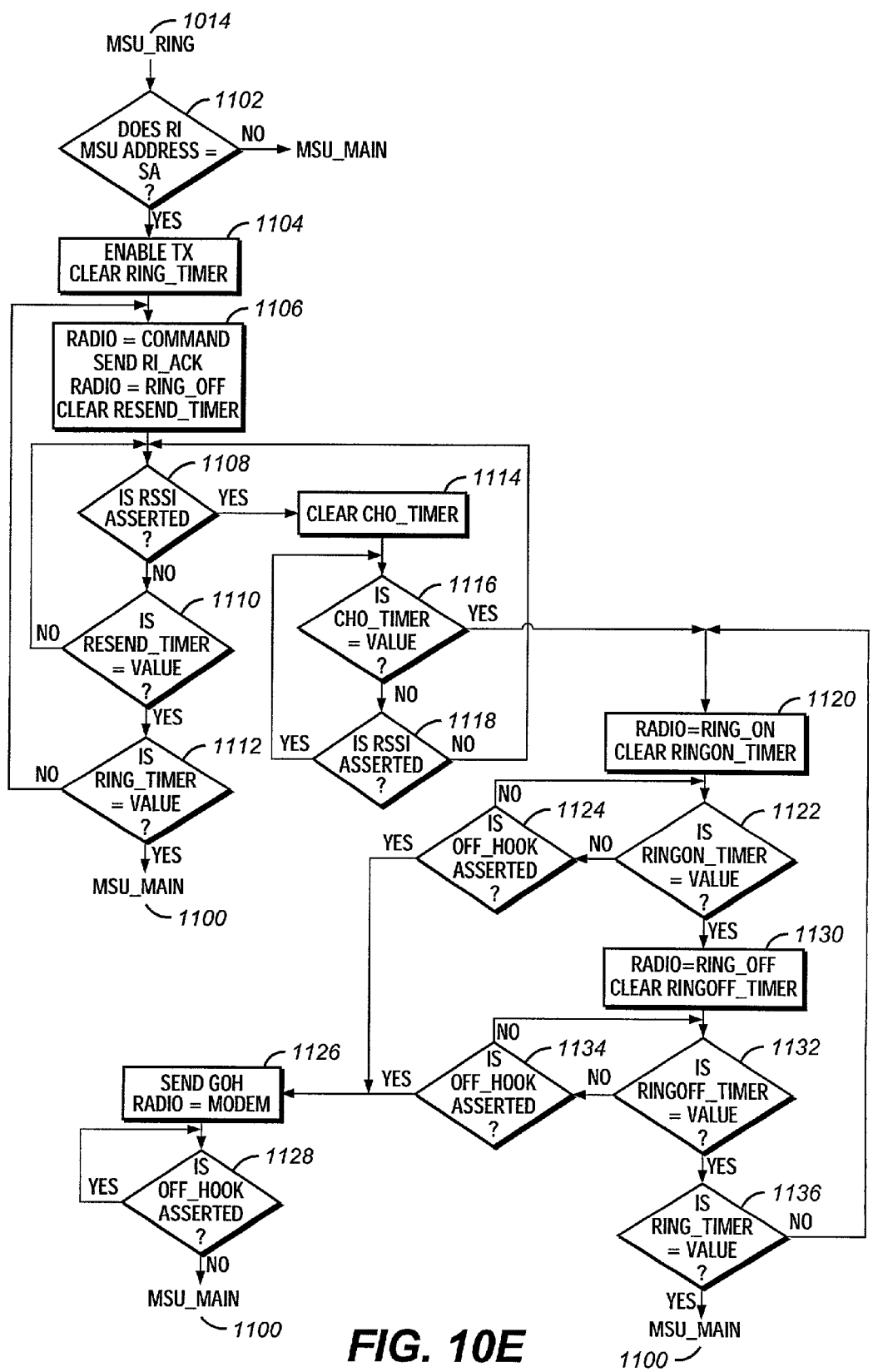
Figure 11A:
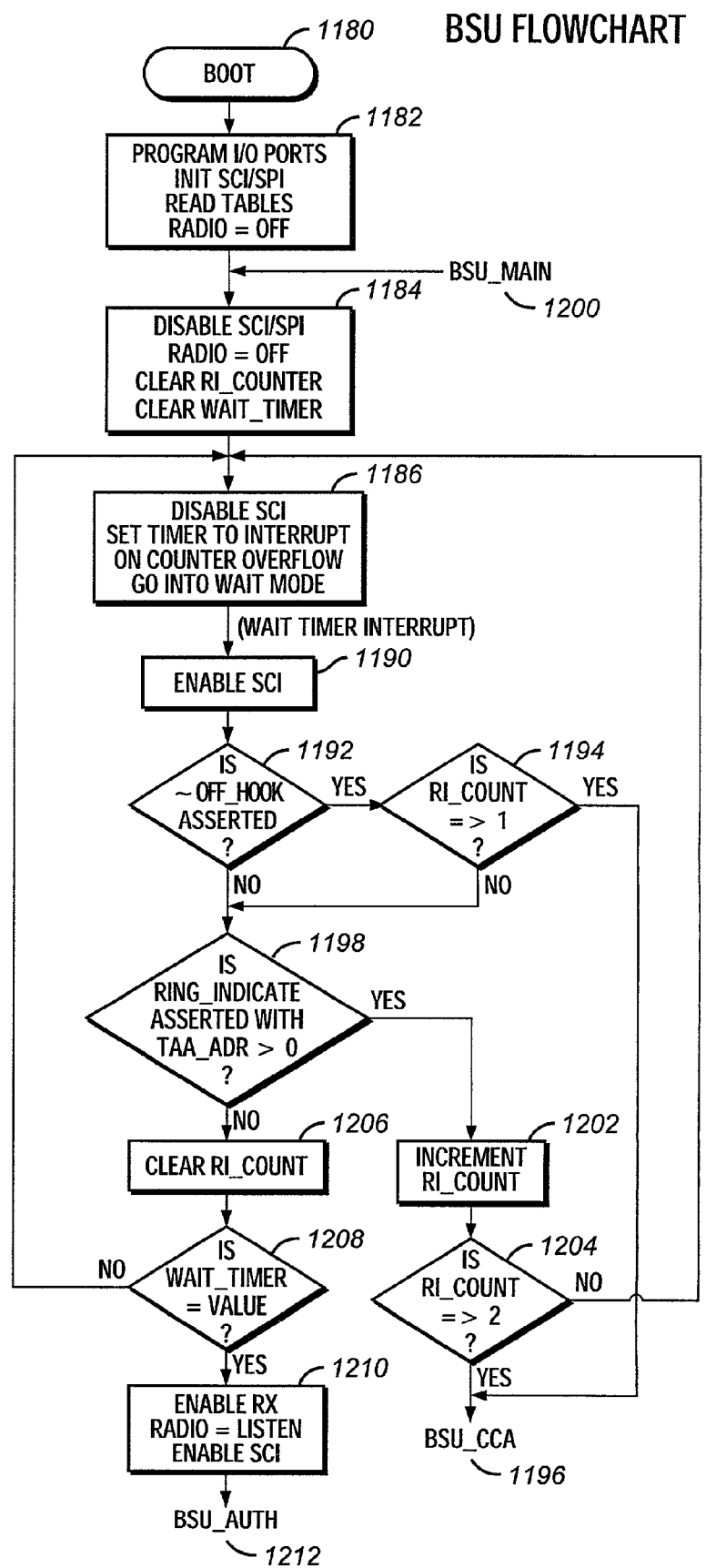
FIGS. 11A, 11B, 11C, 11D and 11E are flowchart illustrations of the operations of the base station unit of FIG. 1.
Figure 11B:
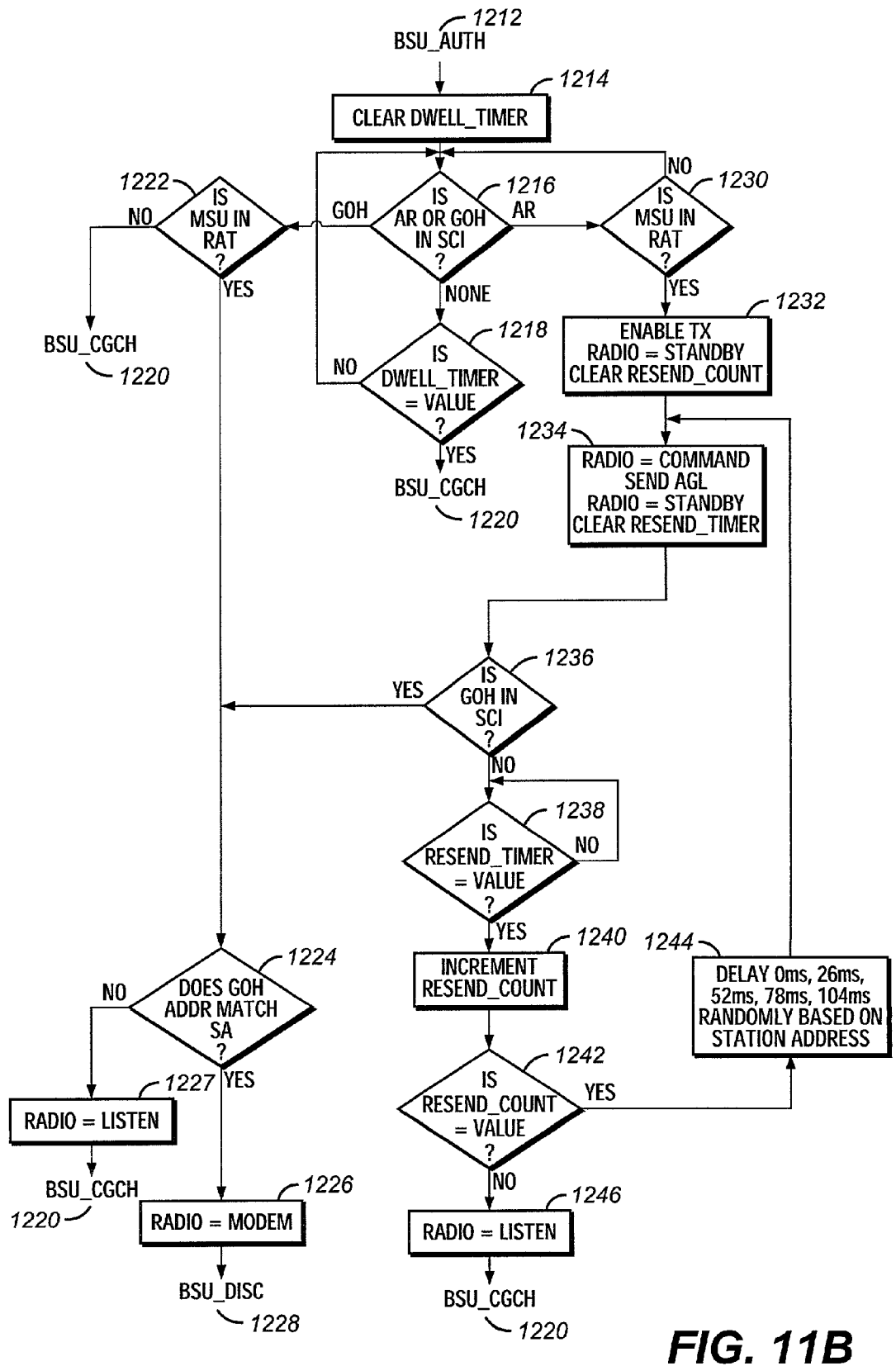
Figure 11C:
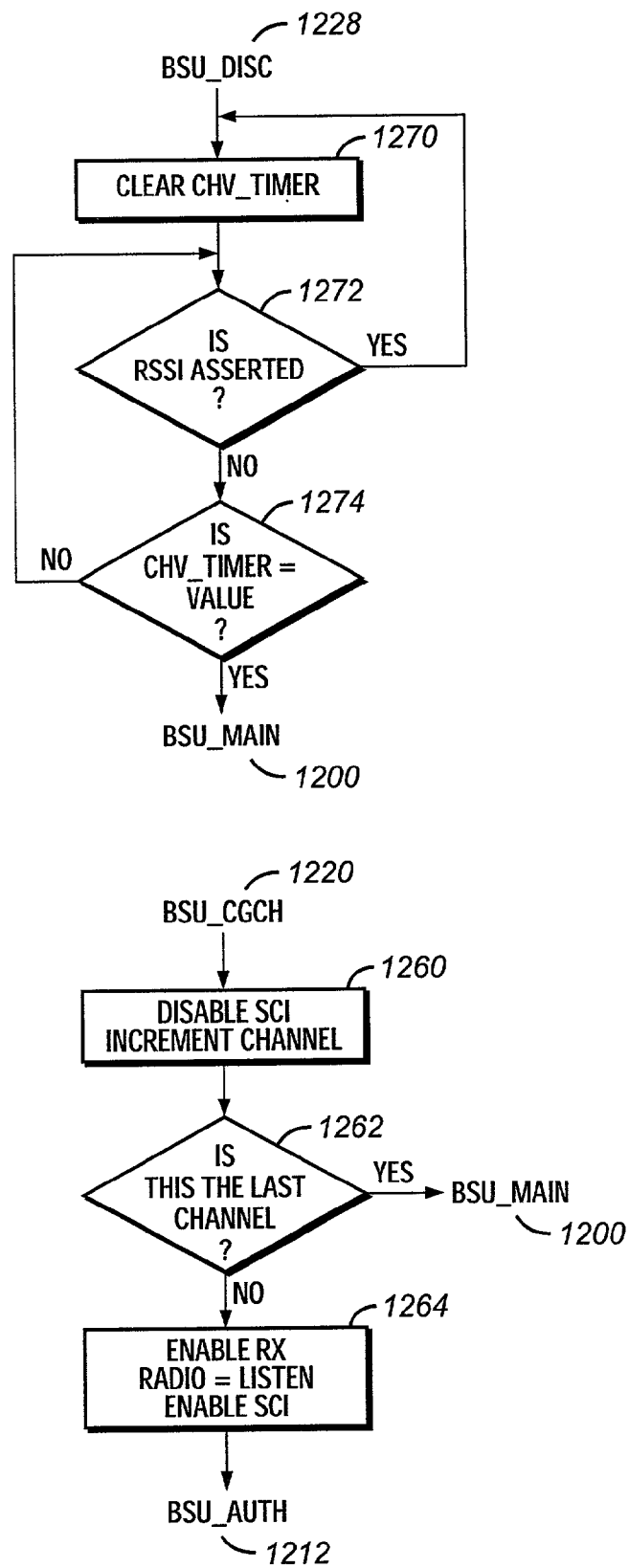
Figure 11D:
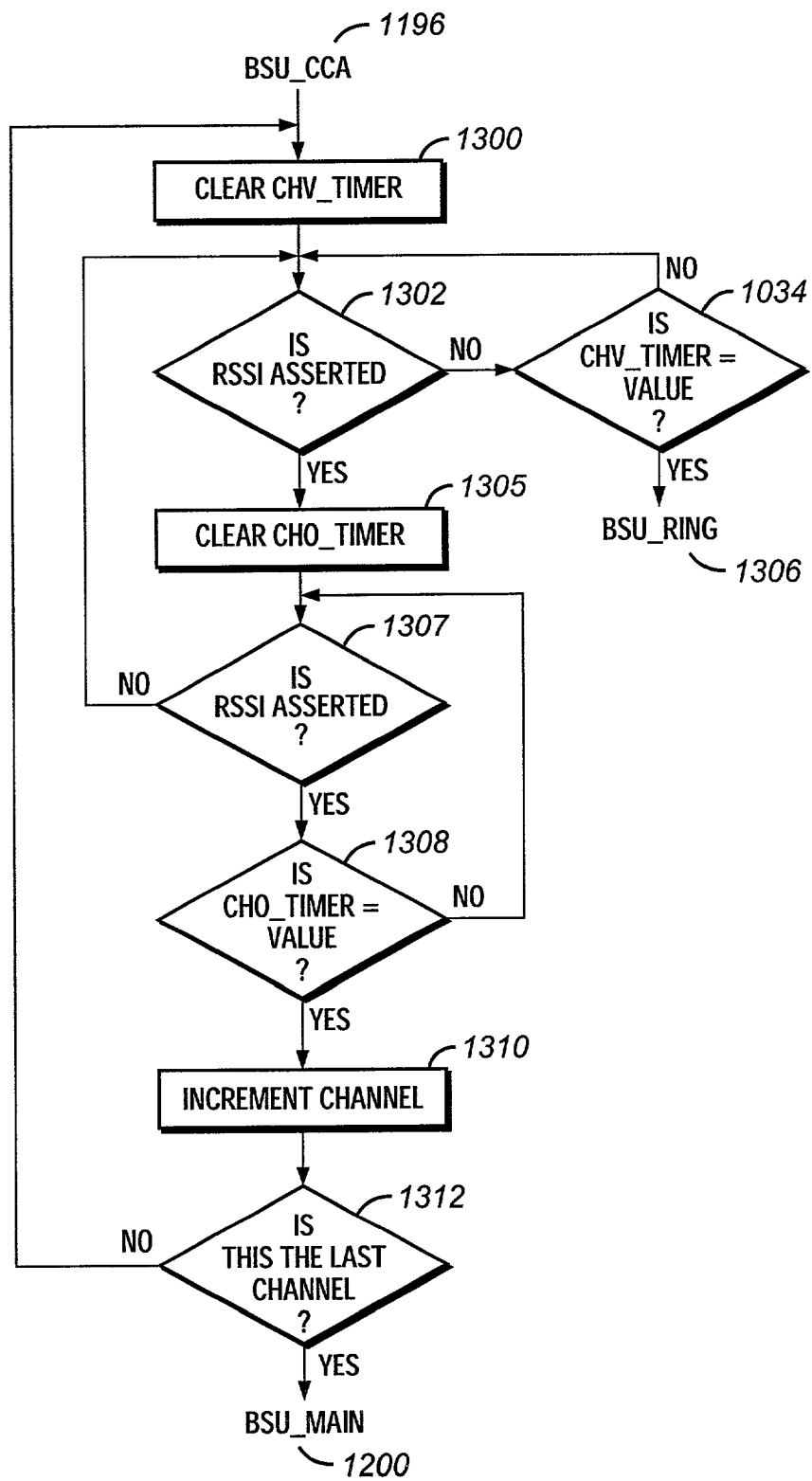
Figure 11E:
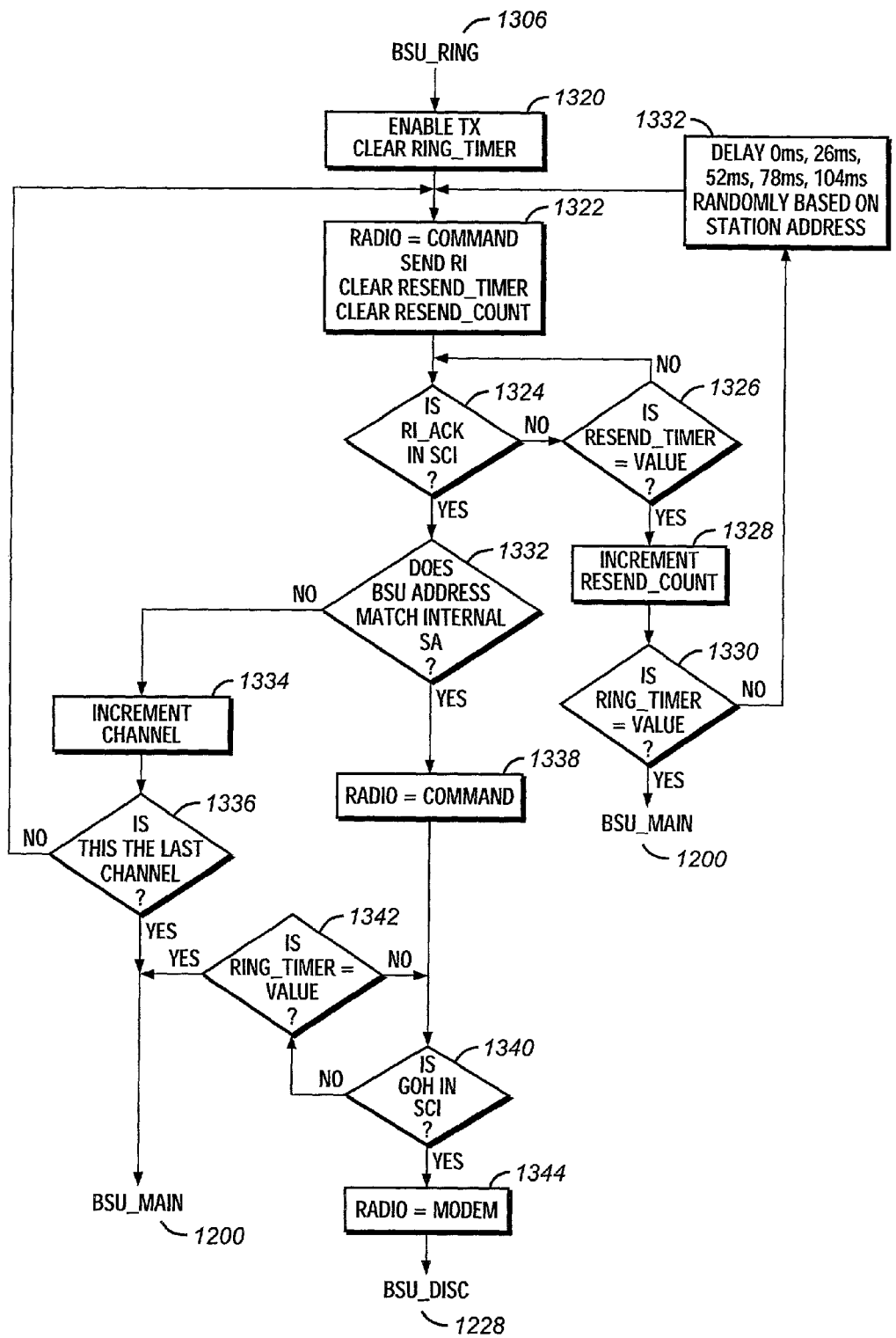

If a channel was vacant, control will have proceeded to the AG-SCAN sequence 1026 (FIG. 10C). The sequence commences at step 1040 to determine if the OFF_HOOK signal is still asserted. If not, control returns to the MSU_MAIN sequence 1100. If it is still asserted, control proceeds to step 1042 where the transmitter 416 is enabled by turning on the VCC_TX_EN, TX_RF_EN and TX_PLL_EN signals. Control then proceeds to step 1044, where the -AUDIO_EN signal is asserted so that the AUDIO_RX signal and the TXA signal from the modem M are disabled so that the microcontroller 412 can send an authorization request or AR command to the BSU 2. After setting the RADIO variable to command mode, the microcomputer 412 assembles and transmits an authorization request command as detailed below. The command includes the MSU 1 address to begin the link security measures. The radio state is then placed in standby mode, where the transmitter RF output is disabled using the TX_RF_EN signal, but the receiver 420 is fully active to await an authorization grant command from the BSU 2. Resend timer and resend counter values are cleared to allow a time out function. Control proceeds from step 1044 to step 1046 to determine if an authorization grant command is present in the serial control interface. As noted below there are two authorization grants, low power and high power. Low power is preferred because in the high power mode the power is such that other systems in more remote locations will not be able to use the same channel as the higher power signal will have a larger effective service area, thus reducing capabilities of the overall system. If an authorization grant command was not present, control proceeds to step 1048 to determine if the resend timer value has reached a preset level. If not, control returns to step 1046. If so, control proceeds to step 1050 where the resend counter is incremented. Control then proceeds to step 1052 to determine if the modem OFF_HOOK signal is still asserted. If not, control returns to the MSU_MAIN sequence 1100. If the modem OFF_HOOK signal is still asserted, this is an indication that there may have been a potential clash between MSUs, so control proceeds to step 1054 where a random delay period is executed. Each MSU 1 has a unique address or identifier and this delay period is preferably based on that address. This is to allow resolution of potential collision situations. Control then proceeds from step 1054 to step 1044 where the authorization request is retried.

If a low power authorization grant signal is received in step 1046, control proceeds to step 1056 to determine if the MSU address provided by the BSU 2 in the authorization grant low command matches the MSU 1 address present in the MSU 1. In this manner the MSU 1 will not act on a grant command for another MSU 1. If it does not match, control proceeds to the CHANGE_CH sequence 1036. If the addresses match, control proceeds to step 1058 where the radio state is again set to command mode, with the transmitter 418 turned on, and a GO_OFF_HOOK command is sent from the MSU 1 to the BSU 2. The command includes the addresses of both the MSU 1 and the BSU 2 granting authorization to prevent inadvertent off hook activation. Control then proceeds to the MSU_CONN sequence 1060.

If an AGH or authorization grant high power command was received in step 1046, control proceeds to step 1062 to determine if the returned MSU address matches. If not, control proceeds to the CHANGE_CH sequence 1036. If it does match, control proceeds to step 1064 where the resend timer is cleared and to step 1066 where the BSU address is stored. Control then proceeds to step 1068 to determine if the resend time has timed out. If not, control proceeds to step 1070 to determine if an authorization grant low command is also present in the serial control interface. If not, control proceeds to step 1068. This loop is used because it has been determined preferable to use a low power BSU if one is available prior to utilizing a high power BSU. If an AGL command is present in step 1070, control proceeds to step 1056. If the resend time has completed and only an authorization grant high power command has been received, control proceeds from step 1068 to step 1072 where the radio state is again placed in command mode and the -AUDIO_EN signal negated and the GO_OFF_HOOK command is transmitted to the BSU 2 providing the high power authorization grant. Control then proceeds to the MSU_CONN sequence 1060.

The MSU_CONN sequence 1060 (FIG. 10D) initiates at step 1080 where a channel open timer is cleared and set to a value of 15 msec. Control then proceeds to step 1082 to determine if the RSSI signal is asserted. If not, control proceeds to step 1084 to determine if the OFF_HOOK signal is still asserted. If not, control returns to the MSU_MAIN sequence 1100. If so, control proceeds to step 1086 where a GO_OFF_HOOK command is again provided. This is an attempt to get the BSU 2 active again as RSSI should have been asserted but apparently has been dropped. If the RSSI signal was asserted in step 1082, control proceeds to step 1088 to determine if the channel open time has completed. If not, control returns to step 1082 to make sure the channel is not dropped and that the OFF_HOOK command was thus recognized. If the channel open time does complete, control proceeds to step 1090 where the radio state is set to modem, which essentially means that the receiver 420 and transmitter 418 are both active and the -AUDIO_EN signal is asserted, so that the RX and TX analog modem data can be provided through the MSU 1. Control then proceeds to step 1092 to determine if the OFF_HOOK signal negated. Control loops at step 1092 as long as the modem M is indicating an off hook state is desired. As soon as the OFF_HOOK signal is negated, indicating the call is to terminate, control proceeds to the MSU_MAIN sequence 1100 where the transmitter 416 is turned off, thus dropping the connection.

The MSU_RING sequence 1014 (FIG. 10E) commences at step 1102 to determine if the MSU 1 address provided in the ring indication command is equal to this units address. If not, control returns to the MSU_MAIN sequence 1100 as the ring indication was intended for another MSU 1. If the addresses match, control proceeds to step 1104 where the transmitter 416 is enabled and a ring timer is cleared. Control then proceeds to step 1106 where the radio state is placed in command mode, that is the -AUDIO_EN signal is disabled with the transmitter 416 enabled, and a ring acknowledge command is transmitted from the MSU 1 to the base unit BSU 2. The ring acknowledge command includes the BSU 2 and MSU 1 addresses for conflict resolution and security. Additionally the RI signal to the modem M is negated and a resend timer is initialized. Control then proceeds to step 1108 to determine if the RSSI signal is asserted, indicating that a carrier is still present. If not, control proceeds to step 1110 to determine if the resend timer has completed. If not, control returns to step 1108. If so, control proceeds to step 1112 to determine if the ring timer has completed. If not, control returns to step 1106 to retry the ring acknowledge command. If the ring timer has completed, control proceeds to the MSU_MAIN sequence 1100 as the ringing is apparently stopped as the BSU 2 is not responding.

If the RSSI signal is asserted, in step 1108 control proceeds to step 1114 where the channel open timer is set. Control proceeds to step 1116 to determine if it has timed out yet. If not, control proceeds to step 1118 to determine if the RSSI signal is still asserted. If not, control returns to step 1108. If it is still asserted, control returns to step 1116. Once the channel open time value has been reached in step 1116, control proceeds to step 1120 where a ring on timer is cleared and the RI signal to the modem M is asserted to indicate a ring indication. Control proceeds to step 1122 to determine if the ring on timer value has completed. If not, control proceeds to step 1124 to determine if the OFF_HOOK signal has been asserted by the modem M. If not, control returns to step 1122. If OFF_HOOK had been asserted, control proceeds to step 1126 where the GO_OFF_HOOK command is transmitted to the base station BSU 2 and then the MSU 1 is converted to modem operation, where the -AUDIO_EN signal is asserted to allow the analog RX and TX to be transmitted. Control then proceeds to step 1128 to determine if the OFF_HOOK signal is asserted. If yes, control loops at step 1128. As soon as the OFF_HOOK signal is negated, control proceeds to the MSU_MAIN sequence 1100 to terminate the link.

If the ring on time had completed in step 1122, control proceeds to step 1130 where the mode is set to ring off, the RI signal is negated and a ring off timer is set. Control then proceeds to step 1132 to determine if the ring off time has completed. If not, control proceeds to step 1134 to determine if the OFF_HOOK signal is asserted. If not, control loops back to step 1132, and if so, control proceeds to step 1126. If the ring off time has completed, control proceeds to step 1136 to determine if the ring time has completed. If not, control loops back to step 1120. If so, control proceeds to the MSU_MAIN sequence 1100. Thus the ring signal is asserted to the modem M for a period of time equal to the ring on time and then is negated for a period equal to the ring off time. If at any time during the ringing sequence the OFF_HOOK signal is asserted, indicating that the modem M in the computer C has recognized the ring request, control proceeds and the link is established for data transfer. Otherwise the computer C is considered non-responsive. Preferably the ring on time is 2 seconds, the ring off time is 4 seconds and the total ring time is 20 seconds.

Thus, the MSU 1 monitors for either an off hook indication or a ring indication to become active to either receive data from or transmit data to the appropriate BSU 2.

FIGS. 11A–11E illustrate the operation of the BSU 2. The boot sequence 1180 commences at step 1182 where the various ports and program tables are initialized and the serial control interface is turned on. Additionally, the radio, i.e. the transmitter/receiver pair, is set to an off state. Control proceeds to step 1184, which is the entry point of the BSU_MAIN sequence 1200. At step 1184 the serial control interface is disabled and the radio system is again placed in an off mode, where both the transmitter 426 and receiver 428 are disabled and powered down, and a ring counter and a wait timer are both cleared. Control proceeds to step 1186 where the serial control interface is once again disabled and the internal timer in the microcomputer 430 is set to interrupt operation upon overflow. Following this, the WAIT instruction of the microcomputer 430 is executed so that the system goes into a low power on mode. In this case both the transmitter 426 and the receiver 428 are powered off and the microcontroller 430 has entered a low power down mode, thus minimizing the power consumption of the BSU 2 to conserve the charge in the capacitor in the power supply 434.

After the timer period of approximately 5 seconds is completed, the microcomputer 430 wakes up and control proceeds to step 1190 where the serial control interface is enabled so that any signal received from the MSU 1 can be received. Control proceeds to step 1192 to determine if the BSU 2 is off hook. If so, control proceeds to step 1194 to determine if at least one ring has been received. If so, control proceeds to a BSU_CCA sequence 1196. If no rings have been received or the OFF_HOOK signal was not asserted, control proceeds from steps 1192 and 1194 to step 1198 to determine if a ring has been received and the BSU 2 has an active MSU address of other than zero. If it is zero, this indicates that no MSU 1 is designated to receive the call and therefore answering is not appropriate. Addresses are designated either by being the last MSU to use the BSU 2 or by a special configuration command as discussed below. If an address is designated, control proceeds to step 1202 where the ring indication count is incremented and then control proceeds to step 1204 to determine if the ring count value is greater than or equal to 2. If so, control returns to step 1186 because it is determined that it is appropriate to pick up only the first ring. This condition is reached only if the MSU 1 is not responding to the ring indication. If the ring count is less than 2, that is it is 1, control proceeds to the BSU_CCA sequence 1196. If in step 1198 it was determined that the active MSU address was zero or there was no ring indication, control proceeds to step 1206 where the ring indication counter is cleared and then to step 1208 to determine if the wait time has completed. If not, control returns to step 1186. If so, control proceeds to step 1210 where the receiver 428 is activated so that the radio is placed in listening mode. This is done by powering up the receiver 428 and enabling it. Control then proceeds to the BSU_AUTH sequence 1212.

The BSU_AUTH sequence 1212 commences at step 1214 where a dwell timer is cleared. Control then proceeds to step 1216 to determine if an authorization request or GO_OFF_HOOK command has been received in the serial control interface. If not, control proceeds to step 1218 to determine if the dwell timer has completed. If not, control returns to step 1216. If so, control proceeds to the BSU_CGCH sequence 1220. Preferably the dwell time is 250 msec so that during this dwell period the BSU 2 looks for commands from the MSU 1. If none are received, the channel is changed and the BSU 2 goes back to wait mode. Thus the BSU 2 sleeps for a period, and awakens briefly to look for a ring and then returns to sleep. After a number of these cycles the BSU 2 briefly monitors for MSU 1 activity and then returns back to sleep.

If in step 1216 it was determined that a GO_OFF_HOOK command was received, control proceeds to step 1222 to determine if the address provided by the MSU 1 is in the response authorization table, the list of MSUs to which the BSU 2 is authorized to respond. If not, control proceeds to the BSU_CGCH sequence 1220. If it is authorized, control proceeds to step 1224 to determine if the MSU address provided in the GO_OFF_HOOK command matches that provided in the ring indication acknowledge command or the authorization request command. If not, control proceeds to step 1227, where the radio is placed in the listen mode so the transmitter 426 is disabled and only the receiver 428 is enabled, and then control proceeds to the BSU_CGCH sequence 1220. If the MSU address is matched, control proceeds to step 1226 where the radio is placed in the modem mode, that is, the audio is enabled and the transmitter 426 and receiver 428 are both fully active, and then control proceeds to the BSU_DISC sequence 1228. It is noted that a separate operation to go off hook is not required as the BSU 2 goes off hook every time the transmitter 426 is enabled, as described above.

If in step 1216 it was determined that the authorization request command was received, control proceeds to step 1230 to determine if the address of the MSU 1 is in the authorization table. If not, control loops back to step 1216. In this manner, a user simply cannot obtain access to a BSU 2 if the MSU 1 has not been authorized or qualified. This prevents users from simply walking to a third party base station BSU and making calls using a different MSU. This limits inadvertent toll charges and access of information. If the MSU 1 was authorized, control proceeds to step 1232 where the transmitter 426 enabled but the system is placed in a standby mode, with both the transmitter 426 and the receiver 428 enabled, but with the transmit RF output disabled by use of the TX_RF_EN signal. Further, the resend count is cleared. Control proceeds to step 1234 where the radio is placed in command mode with the audio disabled and the RF output enabled and the authorization grant low command is transmitted to the mobile station MSU 1 requesting a channel. The radio is then placed in standby mode pending a response. Further, the resend timer is cleared. Control then proceeds to step 1236 to determine if the GO_OFF_HOOK command has been received from the MSU 1. If not, control proceeds to step 1238 to determine if the resend time value has completed. If not, control returns to step 1236 awaiting the command from the MSU 1. If the resend time value has completed, control proceeds to step 1240 where the resend count value is incremented. Control proceeds to step 1242 to determine if the resend count value is less than or equal to a predetermined value. If so, control proceeds to step 1244, which is a delay for a random period based on the station address. This is utilized in the case of a potential collision between two MSUs. Control then proceeds to step 1234 to retry the authorization grant command. If the resend count value has exceeded the predetermined limit, control proceeds to step 1246 where the radio is placed in the listen mode, that is, the transmitter 426 is disabled, and then control proceeds to the BSU_CGCH sequence 1220.

The BSU_CGCH sequence 1220 (FIG. 11C) commences at step 1260 where the serial control interface is disabled and the channel number is incremented to test another channel. Control then proceeds to step 1260 to determine if the last channel has been utilized. If so, control proceeds to the BSU_MAIN sequence 1200. If not, the receiver 428 is enabled so that the radio is in listen mode and the serial control interface is activated in step 1264. Control then proceeds to the BSU_AUTH sequence 1212 to scan the other channel.

The BSU_DISC sequence 1228 commences at step 1270 where a channel vacant timer is cleared. Control proceeds to step 1272 to determine if the RSSI signal is asserted. This would be an indication that an MSU 1 is attempting communication on that channel. If so, control returns to step 1270. If not, control proceeds to step 1274 to determine if the channel vacant time has completed. If not, control returns to step 1274 so that the BSU 2 remains inactive for at least the minimum time required to indicate that the channel is vacant. If the channel vacant time has completed, control proceeds to the BSU_MAIN sequence 1200. This is how the BSU 2 indicates that a particular channel is available for operation again.

The BSU_CCA sequence 1196 (FIG. 11D) commences at step 1300 where the channel vacant timer is cleared. Control proceeds to step 1302 to determine if the RSSI signal is asserted. If not, control proceeds to step 1304 to determine if the channel vacant time has completed. If not, control loops back to step 1302. If so, control proceeds to the BSU_RING sequence 1306 where a ring indication is sent to the MSUs. If the RSSI signal is asserted, indicating that the channel is not vacant, control proceeds to step 1305 where the channel open timer is set. Control then proceeds to step 1307 to determine if the RSSI signal is asserted. If not, control returns to step 1302 awaiting a channel as it would have just opened. If the RSSI signal is still asserted, control proceeds to step 1308 to determine if the channel open time is completed. If not, control returns to step 1307. If so, this is an indication that the channel is occupied. Control then proceeds to step 1310 where the channel number is incremented. Control proceeds to step 1312 to determine if this is the last channel. If so, control returns to the BSU_MAIN sequence 1200 and the call will not be answered. If this is not the last channel, control proceeds from step 1312 to step 1300 where the next channel is then scanned for operation.

The BSU_RING sequence 1306 commences operation at step 1320 where the transmitter 426 is enabled and the ring timer is cleared. Control then proceeds to step 1322, where the radio is placed in command mode so that a command can be transmitted and then the ring indication command is transmitted from the BSU 2 to the MSU 1. The radio is then placed in standby mode awaiting a response and the resend timer and resend count values are cleared. Control proceeds to step 1324 to determine if a ring indication acknowledge command has been received from the MSU 1. If not, control proceeds to step 1326 to determine if the resend time value has completed. If not, control loops back to step 1324. If it has completed, control proceeds to step 1328 to increment the resend count. Control then proceeds to step 1330 to determine if the ring time value has completed. If not, control proceeds to step 1332 where a random delay is provided and then control returns to step 1322. If the ring time is completed, indicating that the ring sequence is over and has not been acknowledged, control proceeds to the BSU_MAIN sequence 1200.

If the ring acknowledge command was received, control proceeds from step 1324 to step 1332 to determine if the BSU address as provided in the ring indication acknowledge command is the same as that of the particular BSU 2. If not, control proceeds to step 1334 where the channel value is incremented and then to step 1336 to determine if this was the last channel. If not the last channel, control returns to step 1322. If the last channel, control proceeds to the BUS_MAIN sequence 1200 as a channel is not available to provide a secure link. If the BSU address does match in step 1332, control proceeds to step 1338 where the radio is placed in command mode. Control then proceeds to step 1340 to determine if a GO_OFF_HOOK command has been received. If not, control proceeds to step 1342 to determine if the ring time has been completed. If not, control loops to step 1340. If the ring time has completed, indicating that the ring indication acknowledge has been received but the off hook command has not been received in a sufficient period, control proceeds to the BSU_MAIN sequence 1200 so that the call is not accepted. If the GO_OFF_HOOK command has been received, control proceeds from step 1340 to step 1344 where the receiver 428 and transmitter 426 are placed in modem mode so that the analog TX or RX data is transmitted correctly. Control then proceeds to the BSU_DISC sequence 1228 to wait for loss of the channel signal from the MSU 1 to drop the link. The MSU 1 holds open the activity of the base station BSU 2 by providing a continuous carrier signal.

In this description it has been assumed that a full command is provided or received by the serial control interface. However, as a command is 6 or 9 bytes long, multiple operations are actually required to develop or send a full command. The serial control interface provides an interrupt on receipt or transmission of a data byte. A software routine is used to assemble a received command and do any required checksum operation and to breakdown a transmitted command and provide the checksum. This routine has been omitted for simplicity and can be readily developed by one skilled in the art.

Detailed operations on loading of authorization addresses into the BSU 2 are not described to simplify the description. This authorization is preferably done utilizing special command software which is available from the manufacturer. Preferably the units will be shipped from the manufacturer with each unit authorized to talk to each other. If further addresses must be authorized, as will be common in a business environment, then the command software will be utilized. Preferably the command operation utilizes the DTMF encoders/decoders to capture a specific telephone number provided over a DTMF channel, such as a 555 number not otherwise utilized for communications. This number is sensed by the microcomputer 430 in the BSU 2 and then the address of the BSU being programmed and the particular MSU to be authorized are provided, preferably also using DTMF signalling. Then BSU 2 then loads this information into the authorization table. Other techniques for entering this could be readily developed, such as a serial port attachment. It is noted that these commands are not necessary for normal operation once the units are authorized, so that after the initial set up of the units by and individual user the operation is transparent to the communications software.

It is also noted that other command signaling techniques could be utilized. For example, DTMF signalling could be used instead of FSK signalling. In this case the microcontroller will provide or receive each character to the DTMF encoder/decoder. Otherwise command operation would be similar.

Therefore several factors can be seen. One is that the operation of the link is entirely transparent to any communication software operating on the computer as the cordless system operates based only on the hardware signals provided by the output of the modem M and the signals on the telephone line. A user is thus able to use his existing communication software package without changing any regard. No special command language has to be developed for normal operations of the link. It can also be seen that there is checking of the availability of a channel and frequent checking of addresses prior to actually developing ownership of a specific channel. As can be seen in the table below, each of the commands includes the appropriate station addresses to allow a fully checked and authorized operation to be developed. A plurality of MSUs can be present and talk to a plurality of BSUs but only one MSU is available to utilize a single BSU at a time for a single event and no other MSU is capable of utilizing that same BSU or eavesdropping from the communications process from the MSU to the BSU during the operation. Further, the use of two channels allows multiple units to exist in a smaller area without potential overlap or unavailability.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

TABLE 1

| | | | | | |
|---|---|---|---|---|---|
| Authorization Request AR | FRM_SYNC | COMMAND | MSU ADDR | CHK SUM | |
| Authorization Grant Low Power AGL | FRM_SYN | COMMAND | MSU ADDR | BSU ADDR | CHK SUM |
| Authorization Grant High Power AGH | FRM_SYN | COMMAND | MSU ADDR | BSU ADDR | CHK SUM |
| Go Off Hook GOH | FRM_SYN | COMMAND | MSU ADDR | BSU ADDR | CHK SUM |
| Ring Indicate RI | FRM_SYN | COMMAND | MSU ADDR | BSU ADDR | CHK SUM |
| Ring Acknowledge RI_ACK | FRM_SYN | COMMAND | MSU ADDR | BSU ADDR | CHK SUM |

The invention claimed is:

1. A system for transmitting modem data between a modem in a computer and a telephone line, the system comprising:

a mobile unit connected to the modem, said mobile unit having an identification value and including:
  means for receiving modem data from and providing modem data to the modem;
  a radio frequency transceiver connected to said mobile unit means for receiving and providing modem data for transmitting and receiving modem data over a radio frequency channel;
  means connected to said mobile unit radio frequency transceiver for providing and receiving command information over said radio frequency channel; and
  means connected to said mobile unit command information means for performing operations responsive to received command information; and a base unit connected to the telephone line, said base unit having an identification value and including:
  means for receiving modem data from and providing modem data to the telephone line;
  a radio frequency transceiver connected to said base unit means for receiving and providing modem data for transmitting and receiving modem data over a radio frequency channel, said base unit radio frequency transceiver operating with said mobile unit radio frequency transceiver;

means connected to said base unit radio frequency transceiver for providing and receiving command information over said radio frequency channel; and means connected to said base unit command information means for performing operations responsive to received command information, wherein command information provided by said mobile unit command information means and said base unit command information means includes said mobile unit identification value and said base unit identification value and wherein said mobile unit means for performing operations operates only if said received command information includes the identification value of said mobile unit.

2. The system of claim 1, wherein said mobile unit command information means further provides an initial request command, wherein said initial request command including said mobile unit identification value but not said base unit identification value, and wherein said base unit means for performing operations is responsive to received command information containing said base unit identification value only if said received base unit identification value is the identification value of said base unit.

3. The system of claim 1, wherein said base unit command information means provides a ring indication command when a ring is received from the telephone line.

4. The system of claim 3, wherein said mobile station means for performing operations causes said mobile unit command information means to provide a ring acknowledge command in response to said ring indication command.

5. The system of claim 3, wherein said mobile station means for performing operations causes said mobile unit command information means to provide an off hook command in response to said ring indication command.

6. The system of claim 5, wherein said base unit means for performing operations causes said base unit to go off hook in response to said off hook command.

7. The system of claim 2, wherein said base unit means for performing operations causes said base unit command information means to provide an authorization grant command in response to an initial request command.

8. The system of claim 7, wherein said mobile station means for performing operations causes said mobile unit command information means to provide an off hook command in response to said authorization grant command.

9. The system of claim 8, wherein said base unit means for performing operations causes said base unit to go off hook in response to said off hook command.

10. The system of claim 1, wherein said mobile unit radio frequency transceiver uses a first frequency to transmit and a second frequency to receive and wherein said base unit radio frequency transceiver uses said second frequency to transmit and said first frequency to receive.

11. A system for transmitting modem data between a plurality of computers, each computer including a modem, and a plurality of telephone lines, the system comprising:

a plurality of mobile units, each connected to the modem in one of the plurality of computers, each said mobile unit having an identification value and including:

means for receiving modem data from and providing modem data to the modem;

a radio frequency transceiver connected to said mobile unit means for receiving and providing modem data for transmitting and receiving modem data over a radio frequency channel;

means connected to said mobile unit radio frequency transceiver for providing and receiving command information over said radio frequency channel; and means connected to said mobile unit command information means for performing operations responsive to received command information; and a plurality of base units, each connected to one of the plurality of telephone lines, each said base unit having an identification value and including:

means for receiving modem data from and providing modem data to the telephone line;

a radio frequency transceiver connected to said base unit means for receiving and providing modem data for transmitting and receiving modem data over a radio frequency channel, said base unit radio frequency transceiver operating with said mobile unit radio frequency transceiver;

means connected to said base unit radio frequency transceiver for providing and receiving command information over said radio frequency channel; and means connected to said base unit command information means for performing operations responsive to received command information, wherein command information provided by said mobile unit command information means and said base unit command information means includes said mobile unit identification value and said base unit identification value, wherein said mobile unit means for performing operations operates only if said received command information includes the identification value of said mobile unit and wherein said plurality of mobile units and said plurality of base units are all within effective radio frequency channel range of each other.

12. The system of claim 11, wherein said mobile unit command information means further provides an initial request command, wherein said initial request command including said mobile unit identification value but not said base unit identification value, and wherein said base unit means for performing operations is responsive to received command information containing said base unit identification value only if said received base unit identification value is the identification value of said base unit.

13. The system of claim 11, wherein said base unit command information means provides a ring indication command when a ring is received from the telephone line.

14. The system of claim 13, wherein said mobile station means for performing operations causes said mobile unit command information means to provide a ring acknowledge command in response to said ring indication command.

15. The system of claim 13, wherein said mobile station means for performing operations causes said mobile unit command information means to provide an off hook command in response to said ring indication command.

16. The system of claim 15, wherein said base unit means for performing operations causes said base unit to go off hook in response to said off hook command.

17. The system of claim 12, wherein said base unit means for performing operations causes said base unit command information means to provide an authorization grant command in response to an initial request command.

18. The system of claim 17, wherein said mobile station means for performing operations causes said mobile unit command information means to provide an off hook command in response to said authorization grant command.

19. The system of claim 18, wherein said base unit means for performing operations causes said base unit to go off hook in response to said off hook command.

20. The system of claim 11, wherein said mobile unit radio frequency transceiver uses a first frequency to transmit and a second frequency to receive and wherein said base unit radio frequency transceiver uses said second frequency to transmit and said first frequency to receive.

21. The system of claim 11, wherein each said mobile unit radio frequency transceiver and said base unit radio frequency transceiver provide and receive modem data and command information over one of two different channels, wherein said mobile unit command information means further provides an initial request command responsive to an off hook request from the modem, wherein said mobile unit command information means provides said initial request command after determining that one of said two radio frequency channels is vacant, wherein said base unit command information means further provides a ring indication command when a ring is received from the telephone line and wherein said base unit command information means provides said ring indication command after determining that one of said two radio frequency channels is vacant.

* * * * *